US010489518B1

United States Patent
Ramachandran et al.

(10) Patent No.: US 10,489,518 B1
(45) Date of Patent: Nov. 26, 2019

(54) VIRTUAL MACHINE OBJECT VERSION CONTROL

(71) Applicant: Nutanix, Inc., San Jose, CA (US)

(72) Inventors: Parthasarathy Ramachandran, Palo Alto, CA (US); Karthik Chandrasekaran, Bangalore (IN)

(73) Assignee: NUTANIX, INC., San Jose, CA (US)

( * ) Notice: Subject to any disclaimer, the term of this patent is extended or adjusted under 35 U.S.C. 154(b) by 288 days.

(21) Appl. No.: 15/060,140

(22) Filed: Mar. 3, 2016

(51) Int. Cl.
*G06F 17/30* (2006.01)
*G06F 9/455* (2018.01)
*G06F 11/14* (2006.01)

(52) U.S. Cl.
CPC .... *G06F 17/30088* (2013.01); *G06F 9/45558* (2013.01); *G06F 11/1448* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,549,518 B1* | 10/2013 | Aron | ................... | G06F 9/45558 718/1 |
| 8,595,191 B2* | 11/2013 | Prahlad | ............. | G06F 17/30091 707/654 |
| 8,601,473 B1* | 12/2013 | Aron | ................... | G06F 9/45533 718/1 |
| 8,850,130 B1* | 9/2014 | Aron | ........................ | G06F 9/52 711/150 |
| 8,959,299 B2* | 2/2015 | Ngo | ..................... | G06F 11/1451 711/162 |
| 9,003,141 B2* | 4/2015 | Nielsen | ............... | G06F 11/1438 711/162 |
| 9,317,375 B1* | 4/2016 | Sadhu | ................. | G06F 11/1451 |
| 9,354,683 B2* | 5/2016 | Patiejunas | ............... | G06F 1/266 |
| 9,460,098 B2* | 10/2016 | Zhang | ............... | G06F 17/30088 |
| 9,521,198 B1* | 12/2016 | Agarwala | ........... | G06F 12/0253 |
| 9,645,859 B1* | 5/2017 | Dash | ......................... | G06F 3/00 |
| 9,772,866 B1* | 9/2017 | Aron | .................... | G06F 9/45558 |

(Continued)

OTHER PUBLICATIONS

ManageEngine, "NetApp Filer Change Auditing" Jan. 23, 2013, 2 pages url: http://www.manageengine.com/products/active-directory-audit/netapp-filer-auditing.html.

(Continued)

*Primary Examiner* — Farhan M Syed
(74) *Attorney, Agent, or Firm* — Vista IP Law Group, LLP

(57) ABSTRACT

A method for indexing virtual machine version snapshots in a virtualization environment commences upon receiving a request (e.g., from an administrator or agent) to initiate a virtual machine version snapshot operation on a subject virtual machine. Processes within or controlled by the subject virtual machine are requested to temporarily suspend transactions and file I/O. When the processes that have been requested to temporarily suspend transactions and file I/O acknowledge quiescence, the method continues by generating a virtual machine version snapshot data structure. An entry in an index is formed from the virtual machine version snapshot data structure. Multiple instances of virtual machine version snapshot data structures can be stored in the index, and the index can be queried to determine the state that a virtual machine had at any of the snapshotted moments in time.

20 Claims, 19 Drawing Sheets

(56) References Cited

U.S. PATENT DOCUMENTS

| | | | |
|---|---|---|---|
| 9,930,029 B2* | 3/2018 | Ramachandran | G06F 9/45545 |
| 2010/0070726 A1* | 3/2010 | Ngo | G06F 11/1451 711/162 |
| 2011/0161299 A1* | 6/2011 | Prahlad | G06F 17/30091 707/649 |
| 2013/0124807 A1* | 5/2013 | Nielsen | G06F 11/1438 711/162 |
| 2014/0047261 A1* | 2/2014 | Patiejunas | G06F 1/266 713/330 |
| 2014/0052692 A1* | 2/2014 | Zhang | G06F 17/30088 707/639 |
| 2014/0075440 A1* | 3/2014 | Prahlad | G06F 17/30091 718/1 |
| 2015/0169413 A1* | 6/2015 | Ngo | G06F 11/1469 711/162 |
| 2015/0268881 A1* | 9/2015 | Nielsen | G06F 11/1438 711/114 |
| 2015/0331708 A1* | 11/2015 | Bala | G06F 11/1402 718/1 |
| 2016/0378613 A1* | 12/2016 | Zhang | G06F 17/30088 707/641 |
| 2017/0228248 A1* | 8/2017 | Bala | G06F 11/1402 |
| 2017/0250976 A1* | 8/2017 | Ramachandran | G06F 9/45545 |

OTHER PUBLICATIONS

Poitras, Steven. "The Nutanix Bible" (Oct. 15, 2013), from http://stevenpoitras.com/the-nutanix-bible/(Publication date based on indicated capture date by Archive.org; first publication date unknown).

Poitras, Steven. "The Nutanix Bible" (Jan. 11, 2014), from http://stevenpoitras.com/the-nutanix-bible/(Publication date based on indicated capture date by Archive.org; first publication date unknown).

Poitras, Steven. "The Nutanix Bible" (Jun. 20, 2014), from http://stevenpoitras.com/the-nutanix-bible/ (Publication late based on indicated capture date by Archive.org; first publication date unknown).

Poitras Steven. "The Nutanix Bible" (Jan. 7, 2015), from http://stevenpoitras.com/the-nutanix-bible/(Publication date based on indicated capture date by Archive.org; first publication date unknown).

Poitras, Steven. "The Nutanix Bible" (Jun. 9, 2015), from http://stevenpoitras.com/the-nutanix-bible/ (Publication late based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

* cited by examiner

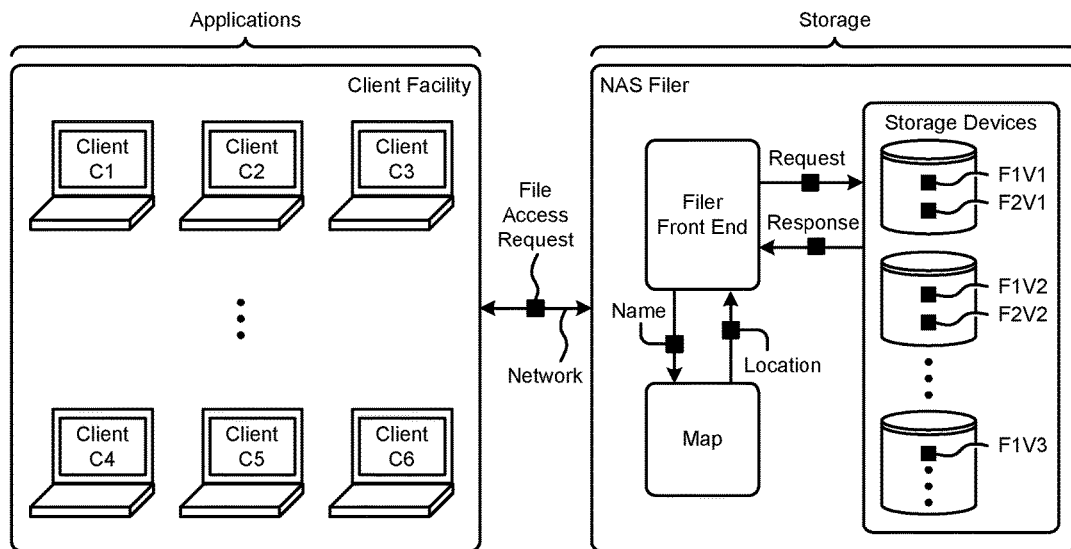
FIG. 1A1
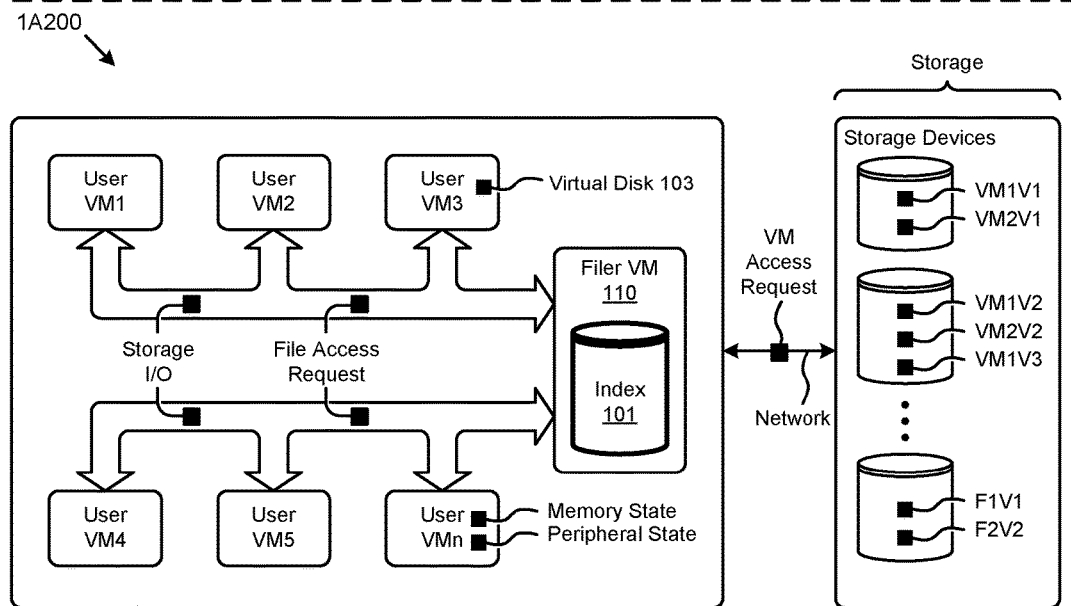
FIG. 1A2

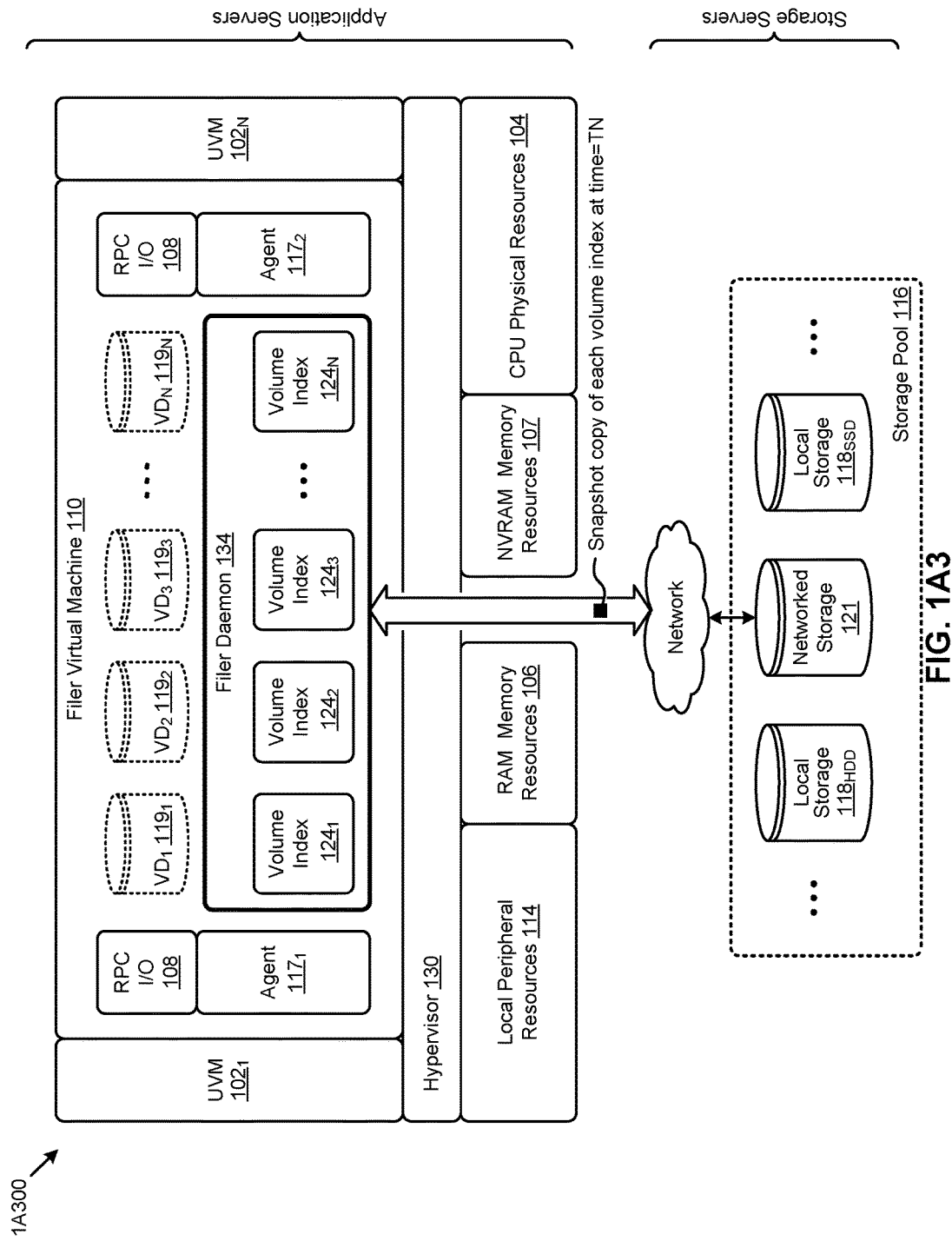

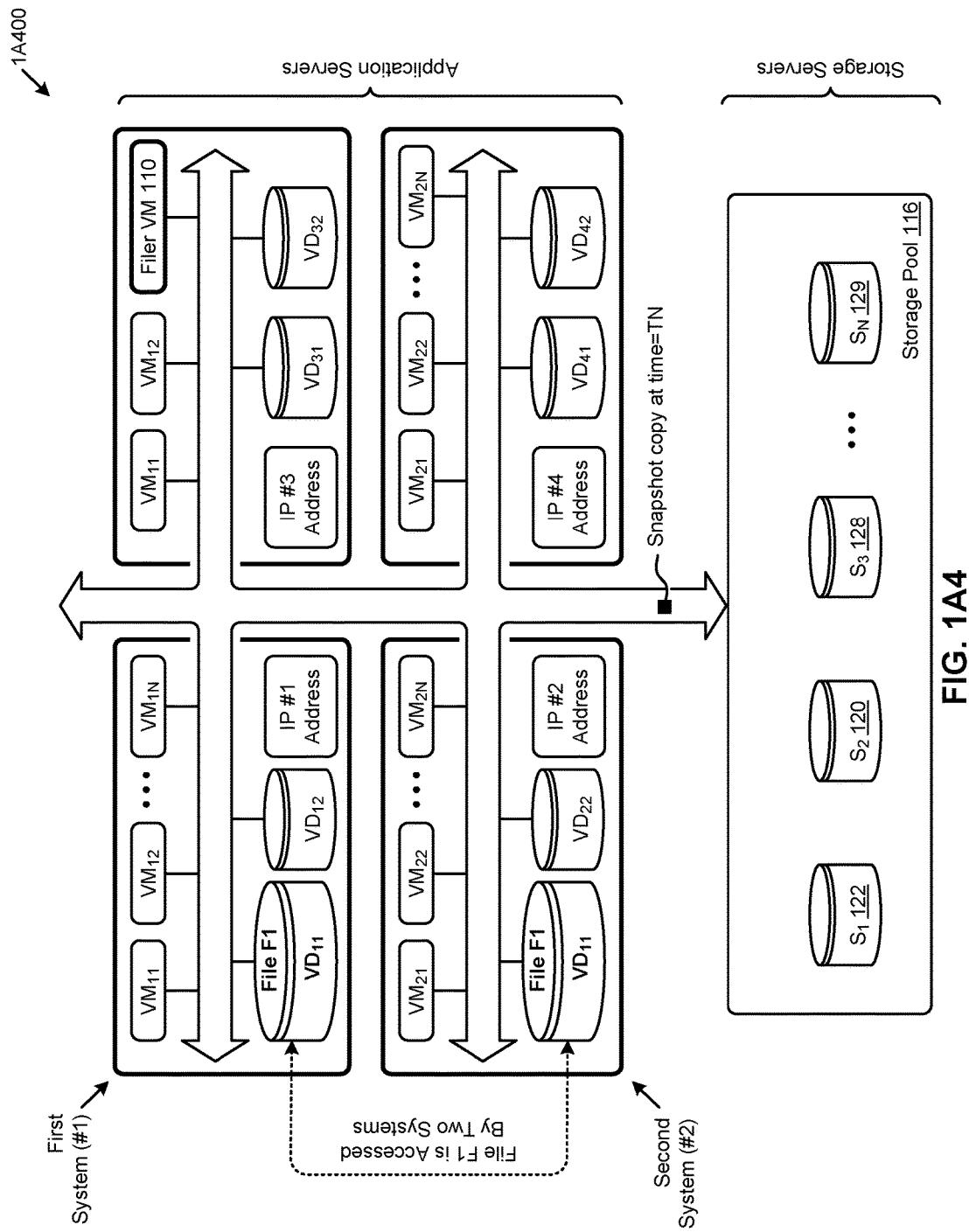
FIG. 1A4

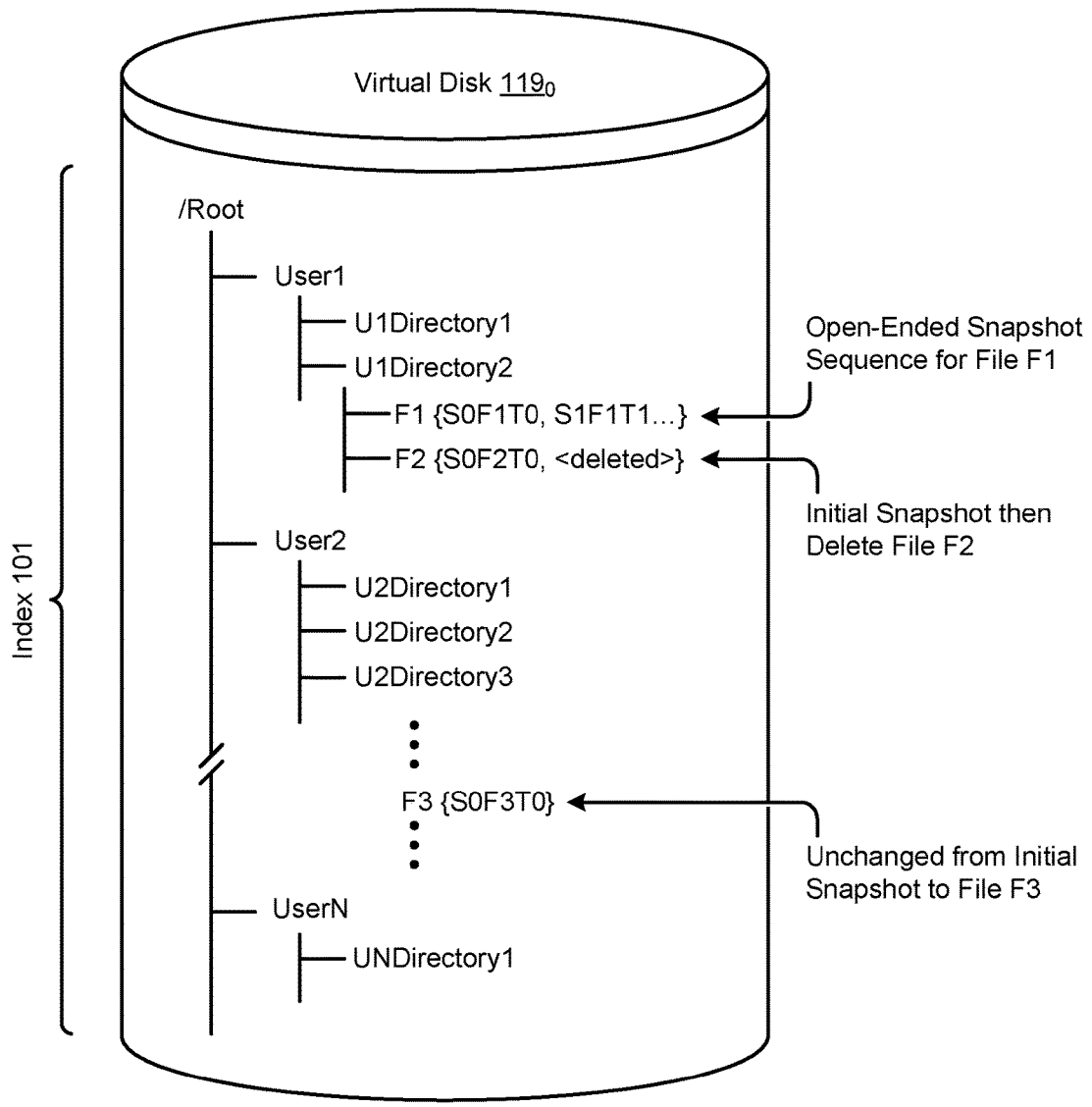
FIG. 1B1

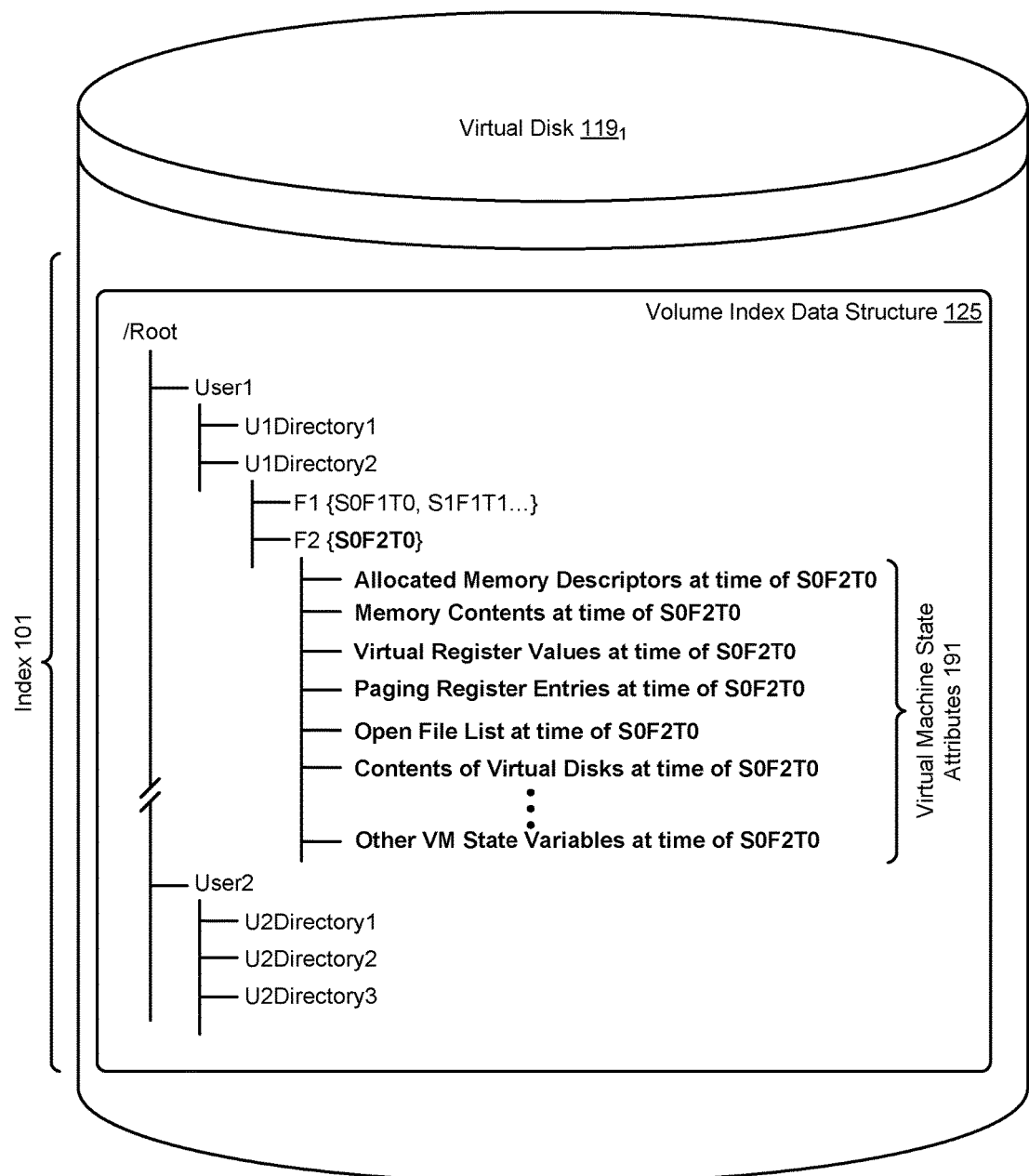
FIG. 1B2

VIRTUAL MACHINE OBJECT VERSION CONTROL

FIELD

This disclosure relates to file system content data protection, and more particularly to techniques for virtual machine object version control in a virtual machine environment.

BACKGROUND

Many computing clusters combine reconfigurable processing resources (e.g., single- and multi-core processors in a network or mesh) with reconfigurable resources (e.g., virtual machines, file systems, databases, backup storage, etc.). Many deployments of such computing clusters employ virtual machines that provide computing and storage services to applications. Certain low-level computing and low-level storage capabilities are provided natively by a hypervisor that runs a particular operating system (e.g., a Microsoft operating system). Unfortunately, reliance on the hypervisor and the set of limitations imposed by the underlying operating system imposes severe limitations pertaining to maintaining versions (e.g., snapshots) of certain of these reconfigurable resources. In particular there are many scenarios where the aforementioned applications need storage services that are not provided by the underlying operating system to the degree needed by the applications and/or by system administrators. For example, when an application or system administrator needs to create, store and manage many versions of a file (e.g., snapshots of a file), the limitations of the underlying operating system (e.g., limitations attendant to static allocations, limitations attendant to the number of concurrently stored versions, etc.) prevent the application or system administrators from implementing desired behaviors, such as enabling fast user searches over a set of stored snapshots in order to identify one or more snapshots that contain a particular searched-for text string.

File system filers that have support for file-level version control either keep the versioning metadata as part of the file system hosting the files or, they keep the versioning metadata in a separate storage volume on the same system. In this legacy scenario (e.g., when keeping the versioning metadata as part of the file system), two acute limitations emerge: (1) the versioning metadata is limited to only attributes pertaining to the file system hosting the files, and (2) there is an operating system-dependent limit on the number of versions that can be supported due to space constraints associated with a file volume. In the case of keeping the versioning metadata in a separate storage volume, the many versions of the file are stored in the separate storage volume, and the storage volume grows super-linearly in size with the number of versions of the files being created and maintained. The performance of accesses to the versioning metadata and corresponding versioned data degrades over time due to fragmentation and other undesirable effects that result from indexing a large number of files and/or file changes. Performance degradations are further exacerbated when a single persistently-stored storage object is accessed by two or more systems since the size of the index grows super-linearly in size with respect to the number of systems and their respective system-specific attributes, as well as growing super-linearly in size with respect to the number of versions of the files being created.

The problems associated with the aforementioned legacy approaches are exacerbated for systems that implement virtual machines. A virtual machine often possesses traits that are not present in files, and thus not present in file snapshots. For example a virtual machine possesses not only a storage footprint (e.g., pertaining to storage objects in use), but also virtual machines possess a state footprint (e.g., pertaining to computing resources in use and/or any forms of state variables). Merely storing snapshots that comprise versions of storage objects in use (e.g., files) fails to account for versioning of the state information pertaining to a particular virtual machine. Inasmuch as the legacy approaches fail to account for versioning, state information of virtual machines also means that the legacy approaches fail to provide an index or other mechanism to facilitate system administrative uses or other access to an index that comprises virtual machine snapshot versions. What is needed is a way to provide virtual machine version querying using an index comprising many snapshots of versioned state information derived from snapshotted virtual machines.

What is needed is a technique or techniques to improve over legacy approaches.

SUMMARY

The present disclosure provides a detailed description of techniques used in systems, methods, and in computer program products for virtual machine object version control in addition to native operating system functions in a virtual machine environment.

In one embodiment, a method for taking virtual machine object version snapshots in a virtualization environment commences upon receiving a request (e.g., from an administrator or agent) to initiate a version snapshot operation on a subject storage object. Processes (e.g., virtual machines) on two or more systems that have the storage object open are requested to temporarily suspend processing. When the processes acknowledge quiescence, the method continues by traversing virtual machine data structures so as to generate a virtual machine object. An index is formed from the virtual machine object wherein the index comprises metadata that is received from or derived from information originating from any number of virtual machines and/or their respective resources and/or any number of systems.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 1A1 depicts an environment including a filer.

FIG. 1A2 depicts a multi-node computing environment including a filer virtual machine.

FIG. 1A3 depicts an environment where virtual machine object version control is provided.

FIG. 1A4 depicts an environment where virtual machine object version control is provided for two or more systems.

FIG. 1B1 and FIG. 1B2 present depictions of an index that is embodied using a virtual disk hierarchical path layout used in systems that provide virtual machine object version control in addition to native operating system file system functions, according to an embodiment.

FIG. 2 depicts volume index maintenance techniques as used in systems that provide virtual machine object version control in addition to native operating system file system functions, according to an embodiment.

FIG. 4 depicts messages and operations in a protocol as used in systems that provide virtual machine object version control in addition to native operating system file system functions, according to an embodiment.

DETAILED DESCRIPTION

Figure 1C:
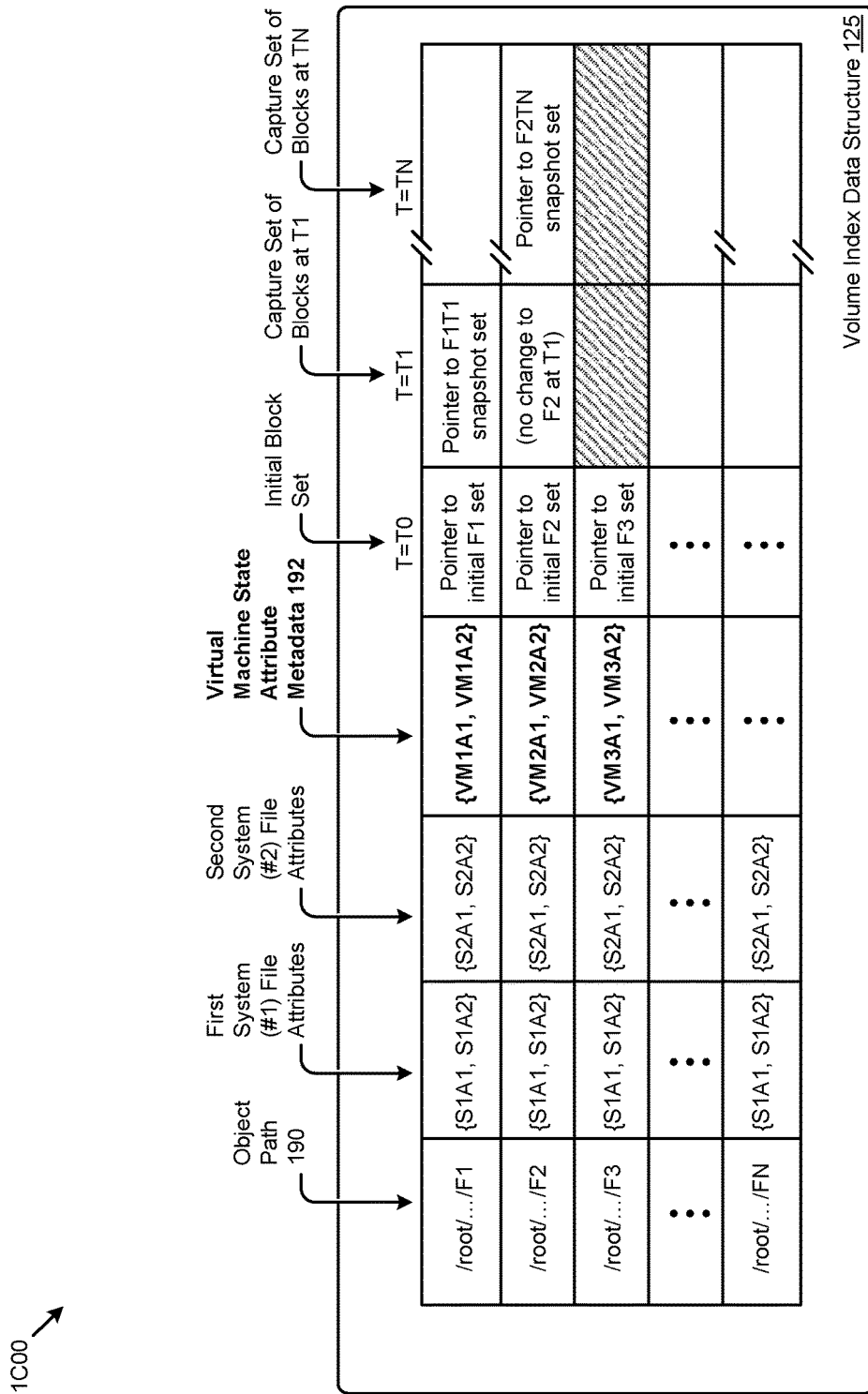
FIG. 1C depicts a metadata layout to implement a volume index as used in systems that provide virtual machine object version control in addition to native operating system file system functions, according to an embodiment.

Some embodiments of the present disclosure address the problems where native operating systems fail to offer storage management facilities sufficient to handle file version management requirements in virtual machine clusters. Some embodiments are directed to approaches for deploying a filer virtual machine such that the virtual machine version storage management is handled by a version management agent rather than by the underlying operating system.
Overview A filer virtual machine (filer VM) can be implemented as a virtual machine. Any virtual machine accessible by the filer VM can be snapshotted at any moment in time. Any snapshot of any such virtual machine can be persisted as a file, and can be accessed by the filer VM as a virtual disk. Each virtual disk can be formatted as a journaled file system. For each of such journaled file systems, a file index is maintained in memory (e.g., see FIG. 1B1), which can be periodically persisted to disk. The index comprises a wide range of virtual machine attributes and virtual machine attribute values that pertain to the aforementioned virtual machine. Such attributes include aspects of the snapshotted state variables (e.g., memory state, peripheral state, etc.) of the virtual machine. The index further comprises a wide range of virtual machine attributes and virtual machine attribute values that pertain to files (e.g., files that can be mounted as virtual disks). Such an index can be maintained as a hash table so that lookup queries pertaining to the attributes and/or attribute values can be satisfied within O(1) time. The index can further comprise a list of versions, either by including a list of version identifiers in the index itself, or by including a reference to another location where a list of version identifiers are stored. Accesses to the index can be performed by any computational element using a set of function calls to handle file add events and file delete events (see FIG. 2). Such functions operated over the index can be performed in O(1) time, regardless of the size of the index or number of files under versioning control or number of versions that are accessible.

In a virtual machine environment, in particular where a filer is implemented using a virtual machine, an agent runs in the filer virtual machine. The agent can be controlled by software using any means such as, for example, using a remote process communication (RPC) interface. The agent can take on various responsibilities, possibly including managing processing within the environment so as to bring the file system to a state of quiescence before taking a version snapshot of the virtual disk that hosts the file system.
Snapshotting Events Version snapshots can be scheduled to occur at a particular time, or in a periodic time pattern, or a version snapshot can be initiated at any moment in time responsive to an asynchronous command (see FIG. 3). Consistency within a particular version snapshot is facilitated by an agent that communicates with processes that have the corresponding files open (e.g., for read access or for read-write access). More specifically, when the time comes for a version snapshot to be taken over a particular file, (e.g., on a schedule, or on the basis of an asynchronous command) an agent will issue a quiescence request to all processes that have the file open. In some cases, a scheduler can issue a "take snapshot" command to the agent (e.g., with a snapshot UUID and an expiry time). In response to the occurrence of the scheduled time or asynchronous command, or any "take snapshot" command, the agent can request quiescence of all I/O (henceforth, input/output or IO) from all processes. Upon receiving an acknowledgement from the processes, the agent can initiate operations that serve to dump the index together with associations with or to the snapshot version created. The dumped index is saved in a quarantined area (e.g., in a separate file, or in a table in a special directory). This process can be repeated each time a version snapshot version is created (e.g., each time a snapshot block list is saved). The process can be repeated for each virtual disk hosting the user data. To facilitate fast access to file snapshots, an index in the form of a hash table is maintained in memory. The hash table stores a mapping from a file name or file path to a set of available snapshots (e.g., path →{S1, S2 . . . Sm}). This fast access organization can be further improved by maintaining a hash table of inode identifiers. Logic is provided to handle the case where a path might be added (e.g., creating a file), then deleted (deleting the file), and then re-added (in which case the inode identifier might change).
Fast Lookup Implementation and Uses The foregoing provides fast two-step lookup from a path and filename to an available version snapshot, and on to the inode corresponding to an available version snapshot, which in turn comprises a snapshot block list. As such it is possible to restore a file to the contents of any previous version snapshot. In some cases, a data structure such as a bit vector (e.g., as is often used to implement a Bloom filter) can be used to determine if a path is either (1) definitely not in the set of paths in the index, or (2) that the path may be in the set. Lookups of paths from an index can be implemented using any form of lookup, including 'hash' lookups using independent and uniformly distributed hashing functions, possibly in conjunction with a Bloom filter.

Restore Procedure

When the end user needs to restore a version snapshot, or for any reason desires to survey previous versions of a given file, a command comes into the filer (e.g., from a user interface). A lookup of the index is performed, and the results are organized for display to the requesting user. The aforementioned display enables a user to make choices as to which version snapshot(s) to view and/or which version snapshot(s) should be the object of some action or operation such as a restore operation. A restored version snapshot can be mounted from within the filer virtual machine, and the virtual disk corresponding to the user-selected version snapshot can be restored. In some cases, the virtual disk corresponding to the user-selected version snapshot can be restored through a background process and attached to the filer VM when the background restore is deemed to have been completed.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 depicts an environment including a filer. As shown, a client facility might host any number of client machines (e.g., laptops, deskside machines, servers, etc.), any of which can access files using a network-attached storage (NAS) subsystem such as the shown NAS filer. The NAS filer manages back-end storage (e.g., see the depicted storage devices), and may store any number of files and/or any number of file versions. A client can access the NAS filer over a network (e.g., an Ethernet network or other network). A client file access request can include, for example, the name of a file and/or its version. The filer front end receives the file access request, then performs a mapping from information in the file access request to information pertaining a starting physical location or locations of a respective file.

A physical location can be described by a drive or unit ID, an extent or volume name, a logical block identifier, etc.). When the physical location is resolved to sufficient specificity to perform a device access, the filer front end sends a request to one or more of the storage devices, and receives a response. A response can often be the contents of one or more blocks of data. In some cases a response can be formatted as a series of transmissions that comprise the contents of a series of blocks of data that constitute the named file. Such a filer paradigm serves the purpose of storing and retrieving named files over a network, however such a filer paradigm merely serves file data a very limited set of information (e.g., creation date, owner, version, etc.) pertaining to the file. In scenarios where a client machine is implemented as a virtual machine, it is expeditious that the filer paradigm be extended to include any aspect of the virtual machine when saving a state snapshot. For example, rather than merely storing and managing files, the entire contents of a virtual machine including memory state, peripheral state, execution state, files, etc. can be stored and managed. In scenarios where client machines are implemented as virtual machines, it may be convenient to implement any of the foregoing functions in a filer virtual machine (filer VM). In some cases, a filer VM is deployed on one node among a group of nodes, any of which can host any sort of a virtual machine. FIG. 1A2 depicts one example of such an environment.

FIG. 1A2 depicts a multi-node computing environment 1A200 including a filer virtual machine. As shown, a plurality of user VMs (e.g., user VM1, user VM2, user VM3, user VM4, user VM5, user VMN, and the filer VM 110) are deployed over a communication fabric such that any VM can at least potentially communicate with any other VM. Moreover, and as shown, the filer VM 110 receives and processes any and/or all forms of storage I/O as may be raised by any of the user VMs. Furthermore, the filer VM can access (e.g., using direct access, or using an agent support, or using hypervisor support) any state of any user VM.

Having such access to the entirety of the VMs facilitates the filer VM to generate versions of entire VMs at any moment in time (see FIG. 1A3). In some situations a filer VM can be configured to take periodic snapshots of one or more VMs, and can store such snapshots in the storage devices. Versioned VM images can be stored for subsequent access (e.g., see VM1V1, VM1V2, VM2V1, VM2V2, VM1V3, etc.). A subsequent access can include a retrieval of all or portions of the contents of a virtual machine at a particular time of a snapshot, including memory state at that particular time, peripheral state at that particular time, execution state at that particular time, file state at that particular time, etc. All or portions of the contents of a virtual machine can be saved using a filer VM. The filer VM can save (e.g., to persistent storage on any one or more of the storage devices) any sorts of a variety of virtual machine objects, virtual disks, and versions thereto (e.g., see file F1V1, F1V2, etc.). Such a virtual machine object can be stored in an association with a name or other identifier, possibly referring to the virtual machine and possibly referring to a time or version sub-identifier. As examples, a virtual machine object for virtual machine VM1 is saved for each of the several versions shown as "VM1V1", VM1V2", and "VM1V3". Also shown are virtual machine objects for VM2, namely "VM2V1" and "VM2V2". Any virtual machine can subsume one or more virtual disks (e.g., comprising files), and such a virtual disk 103, including its contents and its metadata, can be indexed to form a virtual machine snapshot index (see index 101) and stored persistently in storage devices.

The filer VM can create and maintain an index 101 that stores a wide range of attributes and their values as were captured at the time a particular snapshot was taken. As such, one or more virtual machine objects can be identified and retrieved through a query or request made to the index.

A request can be made to such a filer VM to retrieve any aspect of a snapshotted VM, including its memory state at a particular time, its peripheral state at a particular time, its execution state at a particular time, its file state at a particular time, etc., some of which states are shown as virtual machine state attributes (See FIG. 1B2). Such a request can be formulated as a query having an arbitrarily large number of query terms and values that are used to look up (e.g., using the index 101) any one or more snapshots that satisfy the query.

FIG. 1A3 depicts an environment 1A300 where virtual machine object version control is provided. As an option, one or more variations of environment 1A300 or any aspect thereof may be implemented in the context of the architecture and functionality of the embodiments described herein.

An instance of the heretofore introduced virtual machine (VM) refers to a specific software-based implementation of a machine in a virtualization environment. In exemplary embodiments of a VM, hardware resources of a real computer (e.g., CPU, memory, etc.) are virtualized or otherwise transformed to provide managed access to an operating system (e.g., Linux, Unix, etc.) and to physical resources (e.g., CPU physical resources 104, RAM memory resources 106, NVRAM memory resources 107, instances of local peripheral resources 114, etc.).

Hypervisor

A virtual machine is often implemented as one or two layers of software that runs on top of real hardware. In such a two-layer implementation, applications can run in a user virtual machine (e.g., UVM $102_1$, UVM $102_N$) or in a control virtual machine (e.g., filer VM 110) that runs in a layer on top of the hypervisor. The hypervisor defines or has access to virtual representations of physical resources. Strictly as examples, the hypervisor can maintain data structures that comprise current representations of open files and/or open file descriptors, paging register entries, allocated memory descriptors, CPU shadow registers, lists of open files, etc. The aforementioned representations can be accessed and/or traversed so as to identify contents. For example, a file descriptor can be used to access and/or traverse the blocks that comprise the file, the allocated memory descriptors can be accessed and/or traversed so as to identify contents of allocated memory, etc.

A hypervisor 130 implements a thin layer of software directly on the computer hardware or on a host operating system. This hypervisor layer of software contains a virtual machine monitor that allocates hardware resources dynamically and transparently. Multiple operating systems run concurrently on a single physical computer and share hardware resources with each other. By encapsulating an entire machine, including the CPU, memory, operating system, and network devices, a virtual machine become compatible with underlying operating systems, its hosted applications, and its device drivers. Most modern implementations allow several operating systems and applications to safely run at the same time on a single computer, with each having access to the resources it needs when it needs them.

Filer Virtual Machine

A filer virtual machine can be implemented on a node, and any number of nodes can be instanced into a computing mesh (e.g., comprising racks, blades, data processors, cores, etc.). As shown, the filer virtual machine interfaces with one or more storage devices (e.g., $S_1$ 122, $S_2$ 120, $S_3$ 128, $S_N$ 129, etc.). Access to such storage devices can be facilitated by using a storage access layer (e.g., an IO control layer). In this embodiment, the storage devices can be heterogeneous, possibly including instances of block storage, file storage, and possibly including instances of storage media to implement a high-performance and high-reliability multi-tier storage architecture.

The shown filer virtual machine implements user storage volumes as virtual disks (e.g., $VD_1$ $119_1$, $VD_2$ $119_2$, $VD_3$ $119_3$, $VD_N$ $119_N$, etc.). Such virtual disks, as shown, are representations of virtual storage volumes as may be allocated by any of the several virtual machines. Portions of the virtual storage volumes can be held (e.g., as metadata or as cached data) in locations that are locally accessible by the filer VM. Contents of such virtual disks can be stored in a storage pool 116, which storage pool can comprise networked storage 121 (e.g., network attached storage (NAS) or a storage area network (SAN), etc.), and/or any number of instances of node-local hard disk drives (e.g., local storage $118_{HDD}$) and/or any number of node-local solid state storage drives (e.g., local storage $118_{SSD}$). Such virtual disks maintain volume indexes comprising access points (e.g., volumes, paths, logical block identifiers, etc.) to user data that can be persisted to the shown storage devices. In some cases, and as shown, a filer daemon 134 maintains volume indexes (e.g., volume index $124_1$, volume index $124_2$, volume index $124_3$, volume index $124_N$, etc.). A volume index is maintained for each virtual disk (see FIG. 1B1 and FIG. 1B2). A volume index (see FIG. 1C) comprises characteristics of files stored in the virtual disk. The filer daemon can run autonomously within a filer virtual machine, and can make a snapshot copy of a volume index at any moment in time, possibly under direction by one or more agents (e.g., agent $117_1$, agent $117_2$), which can be accessed locally (e.g., by subroutine or method calls) or from outside the filer virtual machine from a remote process (e.g., via a remote process call interface such as the shown RPC I/O 108).

Figure 4:
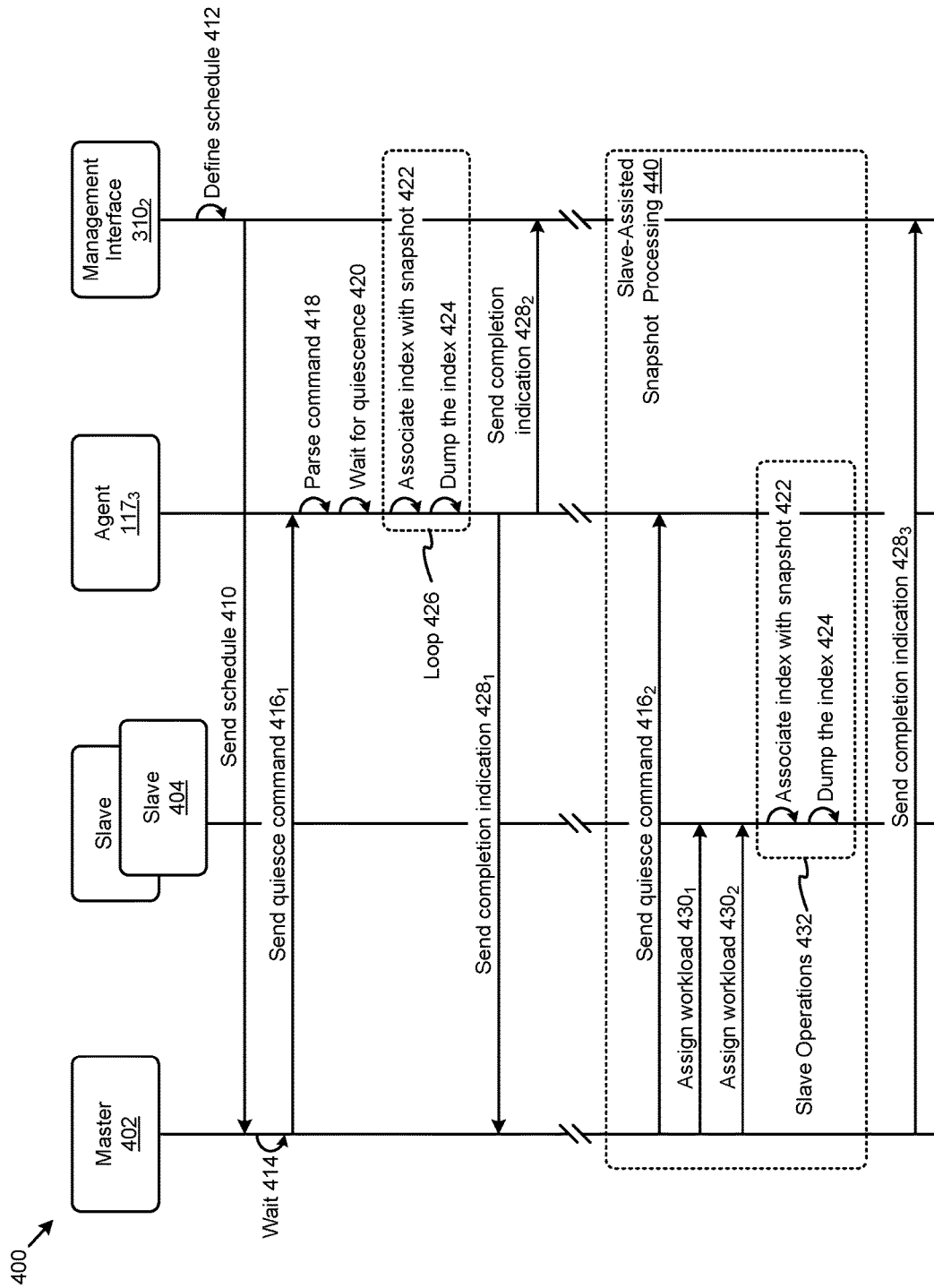

FIG. 1A4 depicts an environment 1A400 where virtual machine object version control is provided for two or more systems. As an option, one or more variations of environment 1A400 or any aspect thereof may be implemented in the context of the architecture and functionality of the embodiments described herein.

The environment 1A400 depicts multiple systems (e.g., first system, and second system, etc.), each of which is individually addressable by a uniquely-assigned IP address. As shown, the first system (#1) has an "IP #1 Address", the second system has an "IP #2 Address", and so on. Any virtual machine within its respective system (e.g., $VM_{11}$, $VM_{12}$, etc.) can be addressed individually by a portion of the IP address. Further, any system can comprise any number of virtual disks (e.g., $VD_{11}$, $VD_{12}$, etc.) that are accessible by any virtual machine in its respective system. As shown, two systems (e.g., first system, second system, etc.), each access the same file F1. The blocks that comprise file F1 are stored as persistent data in storage devices $S_1$, $S_2$, etc.). Accesses to shared file F1 by the first system may be different from accesses to the shared file F1 by the second system. An administrator might want to know the entire and up-to-date status of file F1, and thus, would want to access an index (e.g., an index of a snapshot) that includes aspects of file F1 as may have been generated by either the first system, or the second system, or both.

A filer virtual machine can access physical storage of the data in any virtual disk. Such access is facilitated by the shown filer VM 110, which in turn accesses the storage pool to store persistent data to storage devices $S_1$, $S_2$, etc. In this example, filer VM 110 is situated on a third system; however, the filer VM 110 can be situated on any system that can access files the storage pool.

In this architecture, the filer virtual machine can generate snapshots of files, where the snapshots (e.g., changes to the underlying file) derive from activities that originate from two or more systems. Moreover, the filer virtual machine can generate volume indexes for groups of virtual disks or snapshots of virtual disks such that access to the underlying (e.g., indexed) information (e.g., information from the multiple systems) is stored in the volume index. An index so constructed facilitates fast access to the underlying data (e.g., file information) such that a system administrator can quickly identify a file or snapshot based on a lookup using portions of system information.

As shown, the embodiment of FIG. 1A4 depicts a filer virtual machine that is configured to process any number of transactions from any number of systems over any number of virtual disks. The virtual disks implement a data structure in the form of a hierarchy or tree composed of nodes, the nodes being files or directories, or directories comprising further files or directories. Any node can be accessed uniquely by a path. An example of a virtual disk hierarchical path layout is given in the following FIG. 1B1 and FIG. 1B2.

FIG. 1B1 and FIG. 1B2 present depictions of an index that is embodied using a virtual disk hierarchical path layout used in systems that provide virtual machine object version control in addition to native operating system file system functions. As an option, one or more variations of virtual disk hierarchical path layout or any aspect thereof may be implemented in the context of the architecture and functionality of the embodiments described herein. Also, the virtual disk hierarchical path layout or any aspect thereof may be implemented in any environment.

The virtual disk $119_0$ stores a tree-oriented data structure that can be used to codify hierarchical paths through nodes (e.g., folders, directories, files, links, etc.) through the tree-oriented structure to root nodes. Further, the shown virtual disk hierarchical path layout includes a list of snapshot sequences for files. Strictly as examples, the file depicted as "F1" has an association to a list of snapshot sequences, namely, and as shown, the file F1 is associated with an open-ended snapshot sequence for F1 that is codified as "{S0F1T0, S1F1T1,}". The aforementioned codification refers to snapshot "S0" for file "F1", at time=T0, thus "S0F1T0". Also, the aforementioned codification refers to snapshot "S1" for file "F1", at time=T1, thus "S0F1T1". As such any file can have any number of snapshots that are named uniquely. Using the unique name, the set of snapshots pertaining to a particular file can be deciphered from the list, and can be presented to a user (e.g., for selection in response to a user's restoration request).

Codification of a list of snapshot sequences for files can include indications that a file has been deleted or marked for deletion. As an example, FIG. 1B indicates a codification sequence for file F2 that shows an initial snapshot "S0F2T0" and then a deletion of file F2. In this example, the codification of the list of snapshot sequences for file F2 shows an associated snapshot, namely "S0F2T0", before being deleted. The path to the file F2 can remain in the virtual disk hierarchical path layout indefinitely, even though the file has been deleted or marked for deletion. A newly-opened file F2 can be represented in the virtual disk hierarchical path layout, even though, at an earlier time, there was an earlier designation of file F2. As an example, the newly-opened file F2 can be represented in the virtual disk hierarchical path layout using a unique identifier (e.g., using the inode number, which is unique for each file).

The virtual disk hierarchical path layout can further codify the situation where a file is unchanged from its initial snapshot. In this situation, a file is created (e.g., F3), a snapshot is taken at time $t=T_0$ (e.g., "S0F3T0"), and after time $t=T_0$, there are no more changes to the file, even through to a later time $t=T_N$.

In some cases, strictly as an example, the hierarchical path layout can be organized from a root node (e.g., root label="/root") and children of the root node labeled as pertaining to users (e.g., first level label="User1", "User2", "UserN", etc.). The children of the root node can represent folders or directories (e.g., "U1Directory1", "U1Directory2", etc.), and child nodes of a folder or directory can represent further folders or directories and/or files (e.g., "F1", "F2", etc.). By concatenating node names from a root node to a subject node, a unique path name (e.g., path 132) can be generated, and such a unique name concatenation can be used to refer to a particular node. As shown, an example path can be given as "/root/User1/U1Directory1/F1".

As depicted in FIG. 1B2, an index 101 can comprise any of a set of virtual machine attribute values including any virtual machine states (see the shown virtual machine state attributes 191), which states can be codified into a volume index data structure 125, and which states, by their names and/or state values, can be retrieved through a query. Strictly as examples, a query can be formed to determine if the allocated memory size of any of the virtual machines in the index has exceeded (for example) a particular threshold value (e.g., 14.5 GB). Additional examples are provided as shown and discussed as pertaining to the discussion of the management interface (e.g., see FIG. 6).

All or portions of the virtual disk $119_0$ (see FIG. 1B1) or virtual disk $119_1$ (see FIG. 1B2) are laid out to contain metadata (e.g., conforming to a volume index data structure). One embodiment of such metadata as used in an index 101 is shown and described as pertaining to FIG. 1C.

Figure 2:
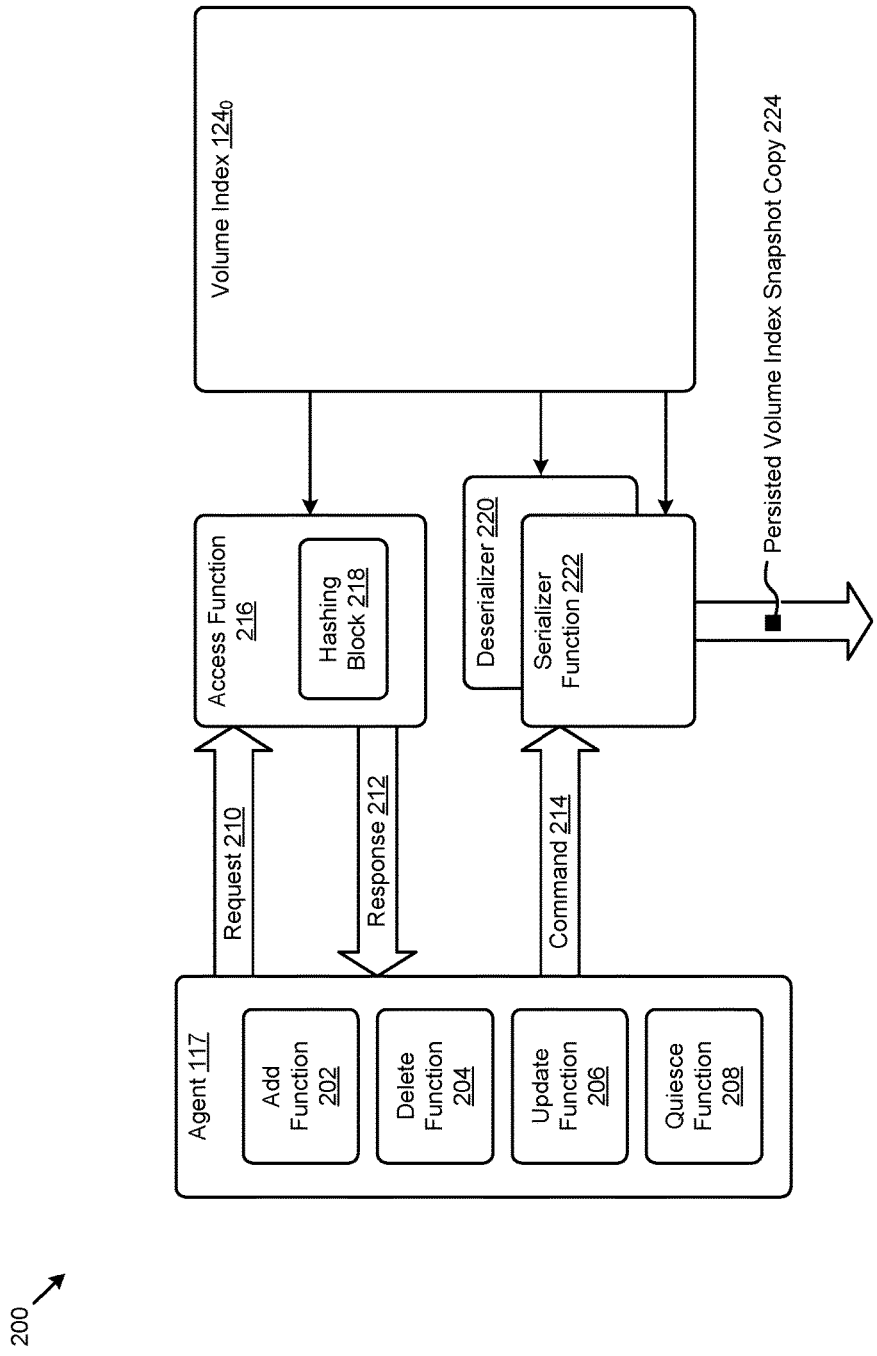

FIG. 1C depicts a metadata layout to implement a volume index 1C00 as used in systems that provide virtual machine object version control in addition to native operating system file system functions. As an option, one or more variations of volume index 1C00 or any aspect thereof may be implemented in the context of the architecture and functionality of the embodiments described herein. Also, the volume index 1C00 or any aspect thereof may be implemented in any environment.

As shown, the volume index data structure 125 comprises data items in a metadata layout that corresponds to each entry in the volume. The rows of the volume index correspond to an object, and the leftmost column codifies the path to that object (e.g., see object path 190).

In addition to the object path, each row can include several sets of attributes. As shown, a first set of attributes originates from or derives from a first system (e.g., system #1), and a second set of attributes originates from or derives from a second system (e.g., system #2). Strictly as examples, information from the first system and/or the second system can comprise IP addresses, a timestamp from each of the first and/or second system, an information tags pertaining to the first and/or second system, or any derivations or combinations thereof.

Each row can include sets of attributes that pertain to a virtual machine state. Such attributes and their state values can be stored in the index as virtual machine state attribute metadata 192. As shown, a first set of attributes (e.g., VM1A1, VM1A2) originate from or derive from a first virtual machine (e.g., VM1), and a second set of attributes (e.g., VM2A1, VM2A2) originate from or derive from a second virtual machine (e.g., VM2).

In addition to the aforementioned metadata, the volume index data structure 125 includes any number of cells that capture a list of blocks. The list of blocks can be codified directly in the cell (e.g., by direct codification of a list of blocks) or indirectly by reference to another location such as an inode, which in turn codifies a list of blocks. The number of columns can increase over time so as to capture the occurrence of a version snapshot. As shown, the columns to the right of the file attributes capture aspects of the occurrence of a snapshot at three different times, namely at time T=T0 (e.g., the initial block set), time T=T1 (e.g., the block set comprising the file at time T1), and time T=TN (e.g., the block set comprising the file at time TN).

Using the aforementioned techniques and data structures, a version snapshot data structure can be generated as follows:
1. Receive a snapshot signal that initiates a snapshotting operation,
2. Generate a version snapshot list (e.g., a list of block identifiers that comprise a version snapshot file),
3. Generate an entry into a version index, and
4. Store the version snapshot list in a persistent storage location.

In some deployments, changes to a virtual machine object can occur frequently. For example, a virtual machine object may change in terms of its contents many times during the life of the virtual machine object, and moreover, a virtual machine object may be subject to operations that add one or more blocks to the virtual machine object (e.g., where the virtual machine object size increases) and/or a virtual machine object may be subject to operations that remove one or more blocks from the virtual machine object (e.g., where the virtual machine object size decreases). Such functions (e.g., operations to "add blocks" and operations to "delete blocks") can be used repeatedly over the lifetime of a virtual machine object. A virtual machine object can be stored as a file in a storage pool, and can be indexed in a virtual machine index. A set of virtual machine index maintenance techniques are shown and discussed as pertains to the following figures.

Figure 1D:
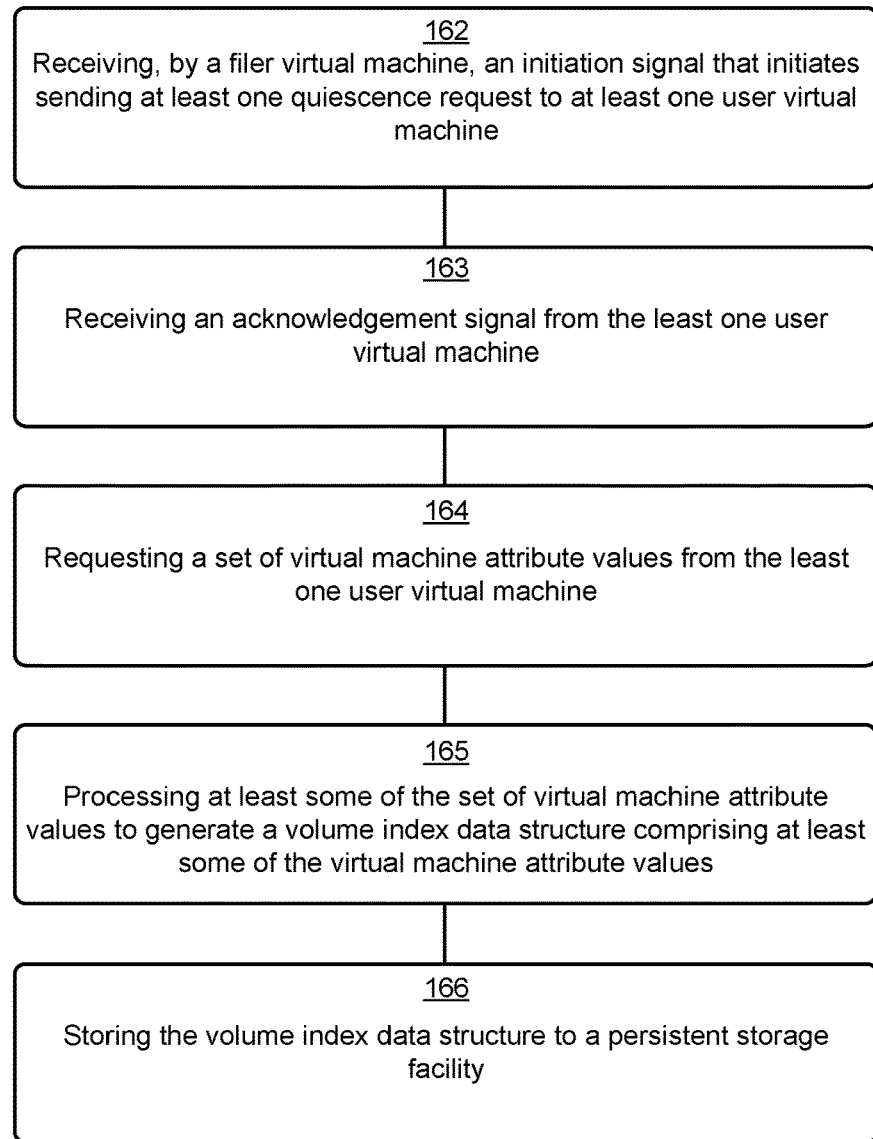
FIG. 1D depicts a volume index generation technique as used in systems that provide virtual machine object version control, according to an embodiment.

FIG. 1D depicts a volume index generation technique 1D00 as used in systems that provide virtual machine object version control. As shown, a process flow commences upon receiving (e.g., from a filer virtual machine), a signal that initiates sending at least one quiescence request to at least one user virtual machine (see step 162). The filer virtual machine receives an acknowledgement signal from the least one user virtual machine, which acknowledgement signal indicates an open time window during which a snapshot can be taken (see step 163). Upon quiescence, the filer virtual machine requests a set of virtual machine attribute values from the least one user virtual machine (see step 164). At least some of the set of virtual machine attribute values are used to generate a volume index data structure comprising at least some of the virtual machine attribute values (see step 165). The index is stored to a persistent storage location (see step 166).

Some of the foregoing steps can be facilitated by one or more agents, aspects of which are discussed hereunder.

FIG. 2 depicts volume index maintenance techniques 200 as used in systems that provide virtual machine object version control in addition to native operating system file system functions. As an option, one or more variations of volume index maintenance techniques 200 or any aspect thereof may be implemented in the context of the architecture and functionality of the embodiments described herein. Also, the volume index maintenance techniques 200 or any aspect thereof may be implemented in any environment.

As previously indicated, a file may be subject to ongoing operations that affect the block content (e.g., an update operation), and/or operations that increase the size of the file (e.g., an add operation), and/or operations that decrease the size of the file (e.g., a delete operation). Such operations can be undertaken or initiated by a computational element such as an agent 117. In particular, operations to "add blocks", operations to "delete blocks", and operations to "update blocks" can be implemented as an add function 202, a delete function 204, and an update function 206. Strictly as one example, an add function 202 can be defined to codify a list of blocks to be added to the makeup of the file, and the add function can then formulate a request 210 to result in a modification of the volume index $124_0$ to record the addition of the added blocks.

To facilitate fast access of, and modification of, the volume index, an access function 216 can be implemented so as to accept a request 210, perform the access (e.g., a READ-MODIFY-WRITE access), and return a response 212 to the requestor. Access operations can include any of the aforementioned READ-MODIFY-WRITE accesses (e.g., to make changes to the row pertaining to a file in the index) or an access operation can add a row to the volume index. To facilitate fast lookup operations performed by the access function 216, some embodiments include a hashing block 218 that facilitates lookup of a file (e.g., by its path) in the volume index. In some cases, a Bloom filter is used to determine access paths within the volume index. Lookups of paths from an index can be implemented using any forms of lookup (e.g., with or without a Bloom filter).

Certain implementations provide additional functions so as to facilitate taking (e.g., storing) snapshots that form consistent units. More specifically, some implementation of volume index maintenance techniques 200 include operations to send the writers of subject files a snapshot signal that carries the semantics of "complete operations and wait".

Such semantics are implemented in part by the shown quiesce function 208. As an example, the quiesce function 208 can interact with file reader-writers (see FIG. 3A and FIG. 3B) to achieve quiescence, and upon achieving quiescence, a consistent snapshot can be taken. In exemplary embodiments, a snapshot of all files identified within the volume index are taken by persisting a snapshot copy of the volume index (e.g., see persisted volume index snapshot copy 224). In some cases, the agent 117 sends a command 214 to a serializer 222 to serialize the volume index for communication over a network and storage in a non-volatile location. As shown, the serializer 222 has a companion deserializer 220 that can be used in restore operations (e.g. see FIG. 7).

The aforementioned operations to achieve quiescence can be facilitated by the agent through a messaging protocol with file reader-writers. Some examples of such a messaging protocol are given in the following FIG. 3A and FIG. 3B.

Figure 3A:
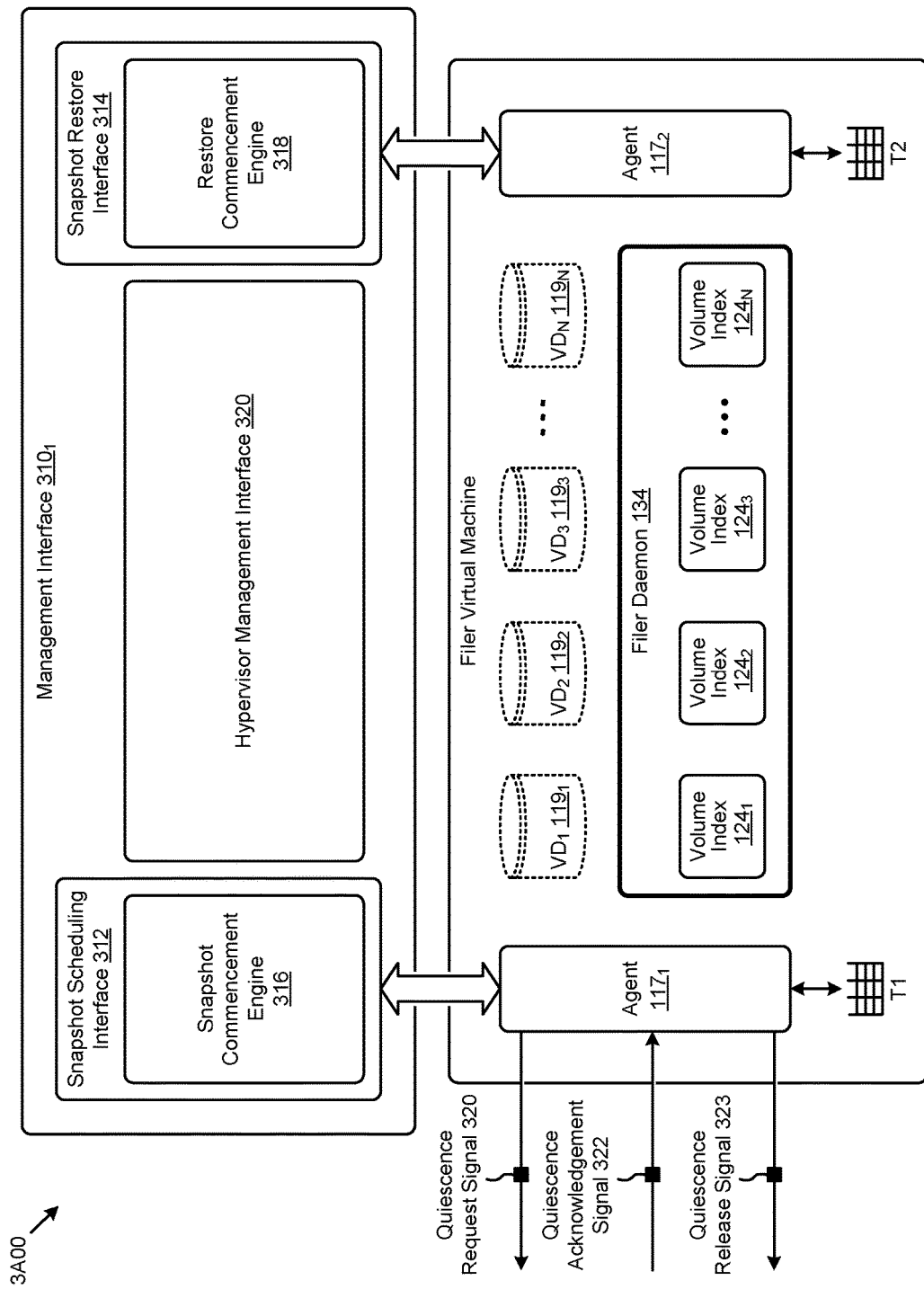
FIG. 3A depicts a snapshot version management technique as used in systems that provide virtual machine object version control in addition to native operating system file system functions, according to an embodiment.

FIG. 3A depicts a snapshot version management technique 3A00 as used in systems that provide virtual machine object version control in addition to native operating system file system functions. As an option, one or more variations of snapshot version management techniques 3A00 or any aspect thereof may be implemented in the context of the architecture and functionality of the embodiments described herein. Also, the snapshot version management techniques 3A00 or any aspect thereof may be implemented in any environment.

The embodiment shown in FIG. 3A includes a management interface $310_1$, which is composed of a snapshot scheduling interface 312 and a snapshot restore interface 314. Interaction (e.g., user or agent interaction) with the snapshot scheduling interface 312 and/or the snapshot restore interface 314 may invoke activities to be performed by a snapshot commencement engine 316 and/or a restore commencement engine 318. In some cases, activities performed by a snapshot commencement engine 316 and/or a restore commencement engine include communications with one or more agents (e.g., agent $117_1$, agent $117_2$), which may be (as shown) subsumed within a filer virtual machine (e.g., filer virtual machine).

In one embodiment, a user interacts with the management interface to specify a snapshot schedule, which may include a particular time to initiate activities pertaining to taking a snapshot, or may include a user request to take a snapshot at that moment in time. Taking a version snapshot that is consistent within itself may require determining that all reader-writers are quiescent, at least during the time period that it takes to write out the blocks pertaining to that particular snapshot. As shown, an agent sends messages or other form of a signals (e.g., one or more instances of quiescence request signal 320) to reader-writers, and waits for acknowledgements (e.g., one or more instances of quiescence acknowledgement signal 322) to come back from the reader-writers. This protocol gives the reader-writers a chance to bring their processing to a quiescent state, at least to the point that the reader-writer deems its writes to the files considered in the snapshot set is in an application-wise consistent state. It is possible that the reader-writers can continue processing, so long as the processing or transactions do not result in writes to the files considered in the snapshot.

The agent may retrieve (e.g., from a hypervisor) and/or consult with a table (e.g., table T1) of user processes, daemons, or other reader-writers of the files considered in the snapshot. The actions involved in making determinations as to which blocks to consider in the snapshot are delayed by the agent until such time that all known reader-writers have sent acknowledgements (e.g., one or more instances of quiescence acknowledgement signal 322) to the agent. The agent can delay, and periodically check that all outgoing quiescence requests have been acknowledged. When the agent has determined that all outgoing quiescence requests have been acknowledged, the agent can continue processing. In some cases, the agent assigns a task master to coordinate activities of taking a snapshot, and the task master can in turn assign workloads to task slaves (e.g., see the embodiment of FIG. 4).

When the activities pertaining to persisting the version snapshot have concluded, then the agent can release the reader-writers from their quiescent state. This can be accomplished for example, by acts of the agent, specifically by sending a quiescence release signal (e.g., quiescence release signal 323) to the reader-writers.

In situations pertaining to a restore, a user may initiate a restore operation, and may select a particular version snapshot from which to process the restore. A user interface (e.g., see FIG. 6) may be provided to assist the user in making such a selection. When the user initiates the restore operation from such a user interface, the shown restore commencement engine will communicate with an agent (e.g., agent $117_2$), which will in turn cause the agent to establish a sufficiently quiescent environment in which the process the restore operations can begin. In some cases, the same protocol used in establishing quiescence for the snapshot commencement can be carried out prior to initiating file IO activities pertaining to the restore activity. In some situations the agent may retrieve (e.g., from a hypervisor) and/or consult with a table (e.g., table T2) of user processes, daemons, or other reader-writers of the files considered in the snapshot being restored. The actions involved in restoration of the version snapshot can be delayed by the agent until such time as the environment is sufficiently quiescent so as to begin the restoration file IO operations.

In some environments, the agent within the virtual filer machine may communicate with an external agent (e.g., an agent that operates within an execution context other than within the virtual filer machine). Such a situation is shown and described as pertains to FIG. 3B.

Figure 3B:
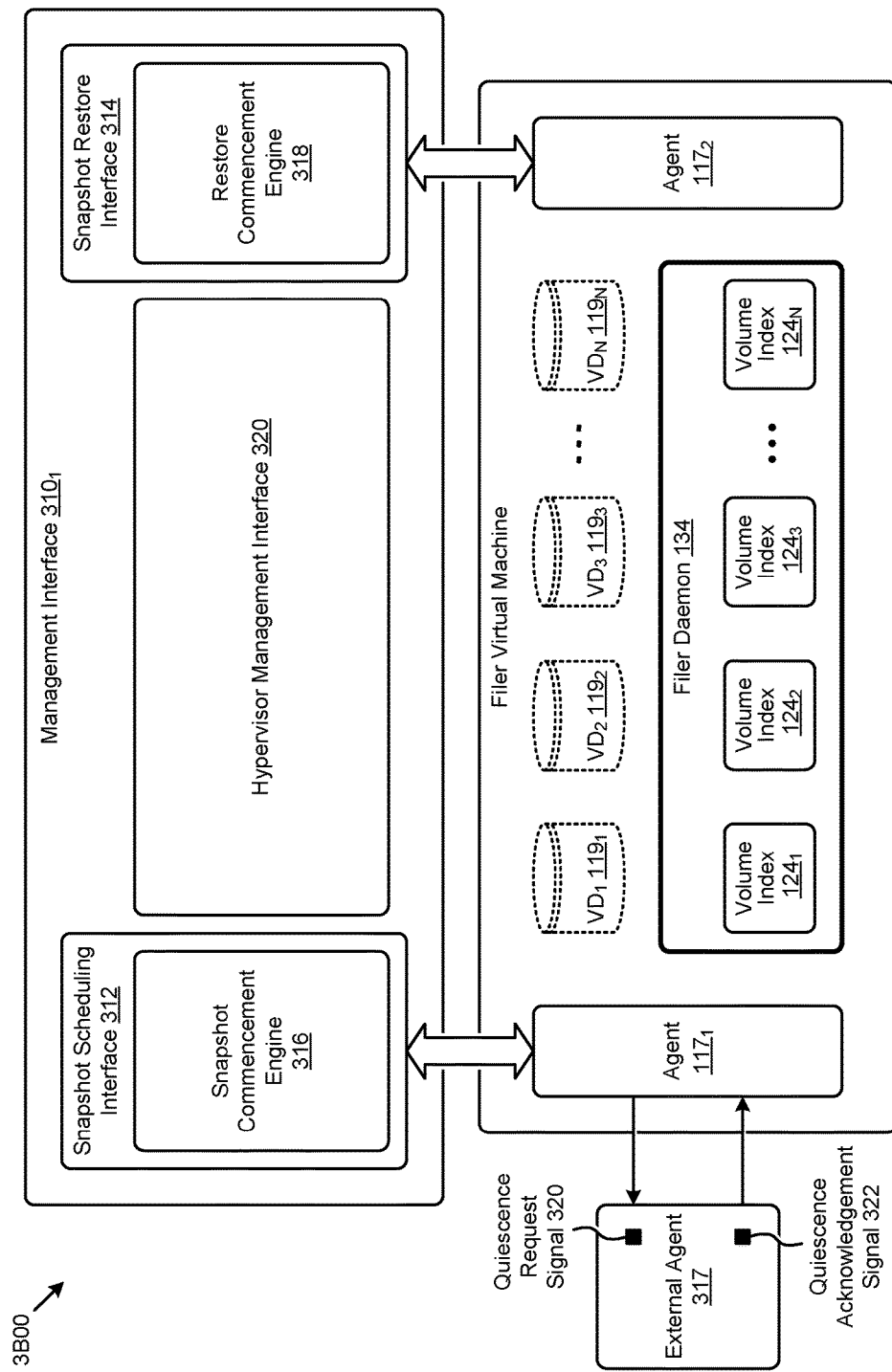
FIG. 3B depicts a snapshot version management technique using an external service to provide virtual machine object version control in addition to native operating system file system functions, according to an embodiment.

FIG. 3B depicts a snapshot version management technique 3B00 using an external service to provide virtual machine object version control in addition to native operating system file system functions. As an option, one or more variations of the snapshot version management technique 3B00 or any aspect thereof may be implemented in the context of the architecture and functionality of the embodiments described herein.

The embodiment shown in FIG. 3B includes an external agent 317. The external agent can receive messages or other form of a signals (e.g., one or more instances of quiescence request signal 320) and response with acknowledgements (e.g., one or more instances of quiescence acknowledgement signal 322). In this example, the external agent can handle aspects of determining various states of quiescence, possibly including managing processing within the overall environment so as to bring the overall environment to a known state before taking a version snapshot. When the activities pertaining to taking a version snapshot have concluded, then the agent can advise the external agent to release the reader-writers from their quiescent state. This advice can be acted upon by acts of the external agent, specifically for example, by releasing the reader-writers under its purview.

FIG. 4 depicts messages and operations in a protocol 400 as used in systems that provide virtual machine object version control in addition to native operating system file system functions. As an option, one or more variations of protocol 400 or any aspect thereof may be implemented in the context of the architecture and functionality of the embodiments described herein. Also, the protocol 400 or any aspect thereof may be implemented in any environment.

As aforementioned, an agent can assign a task master 402 to coordinate activities of taking a snapshot, and the task master can in turn assign workloads to task slaves (e.g., one or more instances of task slave 404). Coordination between a user interaction to define a version snapshot schedule and conclusion of slave tasks that account for taking a version snapshot can be carried out using a protocol 400. In the portion of protocol 400, as shown a user interacts with a management interface $310_2$, which in turn invokes activities that conclude with the taking a version snapshot. In this example, the user defines a schedule (e.g., see operation 412), which schedule is sent (e.g., see message 410) along with an initiation signal to a task master 402, which task master may wait (see operation 414) until an appointed time (e.g., as may be codified into the schedule). The task master may initiate actions to bring the system to a state of quiescence. For example, and as shown, the task master may send a quiesce command (see message $416_1$) to agent $117_3$. The agent can in turn parse the command (see step 418) and proceed to carry out all of, or portions of, the protocol discussed in FIG. 3A and FIG. 3B, and may wait for quiescence (see operation 420) before associating an index with a version snapshot (see operation 422) then dumping the index of the subject virtual disk (see operation 424). In some situations, the act of taking a version snapshot may include dumping the index of multiple subject virtual disks. Accordingly, the agent may loop (see loop 426) to perform multiple associations and to perform multiple dump operations. When loop iterations are complete, the agent sends a completion indication (see message $428_1$) to the master task, and possibly also may send a completion indication (see message $428_2$) to the management interface.

In some situations the master task performs additional steps during the processing of a version snapshot. The shown slave-assisted snapshot processing 440 is invoked when a task master sends a quiesce command (see message $416_2$) to an agent. The agent may merely recognize that the master task is to carry out slave-assisted snapshot processing, and may merely wait for some notification of completion, or may take no action at all. The task master may assign workloads to slave tasks (see message $430_1$ and message $430_2$). In some cases, the task master is responsible to invoke as many slaves as may be deemed to participate in the set of slave operations (e.g., see slave operations 432). The slaves may individually and/or collectively perform multiple associations and may perform multiple dump operations. When slave operations pertaining to the slave-assisted snapshot processing is deemed to have been completed, the task master sends a completion indication (see message $428_3$).

Figure 5:
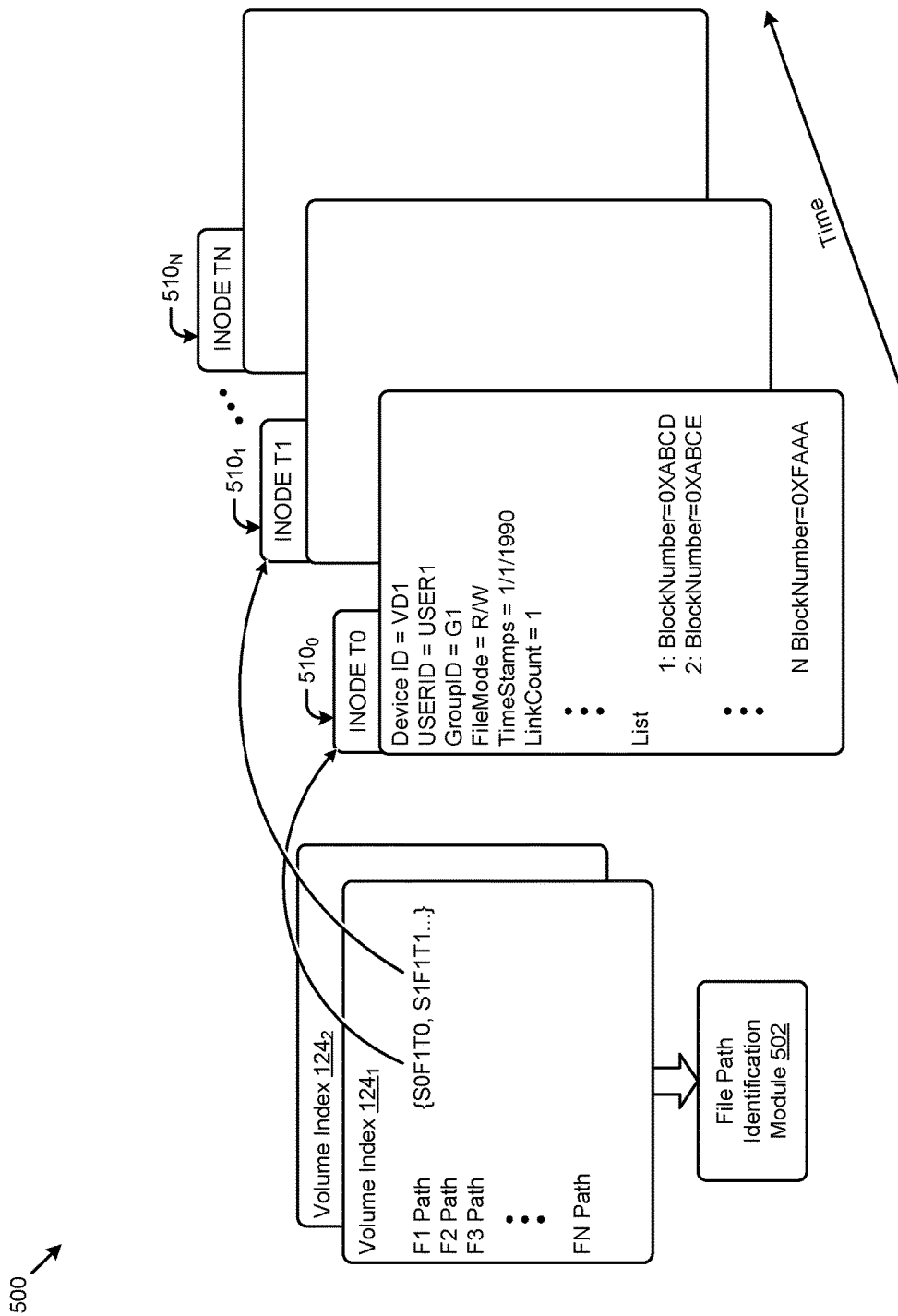
FIG. 5 depicts an example inode referencing technique as used in volume index layouts that facilitate virtual machine object version control in addition to native operating system file system functions, according to an embodiment.

FIG. 5 depicts an example inode referencing technique 500 as used in volume index layouts that facilitate virtual machine object version control in addition to native operating system file system functions. As an option, one or more variations of inode referencing technique 500 or any aspect thereof may be implemented in the context of the architecture and functionality of the embodiments described herein. Also, the inode referencing technique 500 or any aspect thereof may be implemented in any environment.

The embodiment shown in FIG. 5 is merely one example to show that a volume index (e.g., volume index $124_1$, volume index $124_2$, etc.) can codify the existence of a version snapshot using a pointer or other reference to one or more inodes (e.g., inode $510_0$, inode $510_1$, inode $510_N$, etc.). As shown an inode can be formed at any moment in time (e.g., see time=T0, time=T1, time=TN), and an inode comprises information pertaining to a version snapshot. Information pertaining to a version snapshot comprises a list of blocks. As shown, inode $510_0$ includes a list of blocks given as the ordered listing of "0XABCD", "0XABCE", . . . and 0XFAAA. At another time (e.g., time=T1) another inode can be generated, and may comprise a different list of blocks.

Given a volume index, the occurrence of a file within the volume index can be determined using a file path identification module. Such a file path identification module (e.g., file path identification module 502) can search through the volume index to determine the existence of the requested file, or, a file path identification module can use searching/sorting/filtering techniques, possibly including a Bloom filter so as to make determinations and/or identifications of the existence of a particular file or path in a particular volume index while incurring only a small amount of processing, and while incurring only a small amount of latency.

Figure 6:
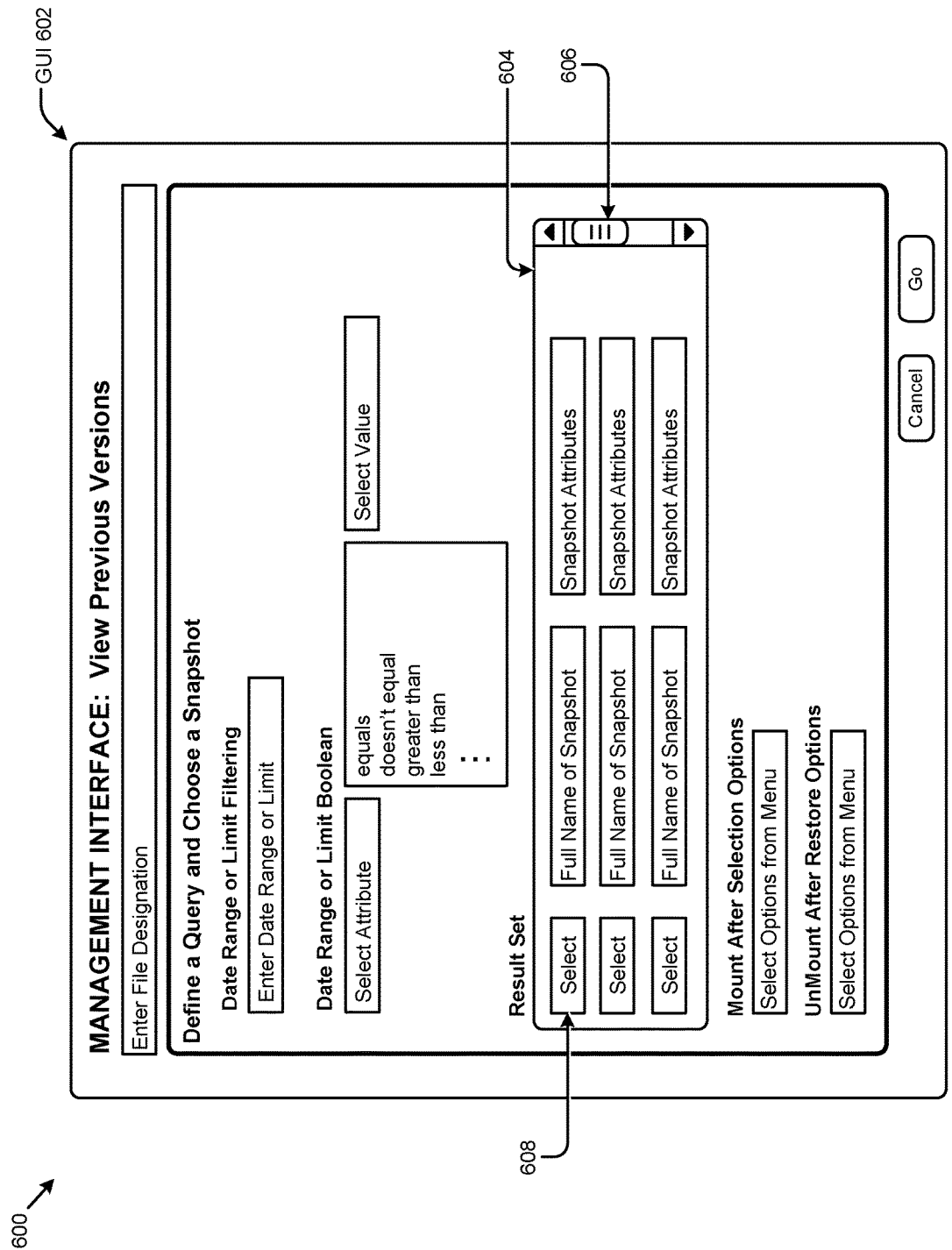
FIG. 6 depicts an example snapshot version management user interface as used in systems that facilitate virtual machine object version control in addition to native operating system file system functions, according to an embodiment.

FIG. 6 depicts an example snapshot version management user interface 600 as used in systems that facilitate virtual machine object version control in addition to native operating system file system functions. As an option, one or more variations of snapshot version management user interface 600 or any aspect thereof may be implemented in the context of the architecture and functionality of the embodiments described herein. Also, the snapshot version management user interface 600 or any aspect thereof may be implemented in any environment.

The graphical user interface (e.g., GUI 602) shown in FIG. 6 can be presented to a user such that the user can review and select previously captured version snapshots. As shown, the management interface provides a set of screen devices (e.g., text boxes, pull-down menus, checkbox selectors, etc.) that facilitate user specification of a query, which query is in turn executed over a set of records pertaining to previously-captured version snapshots. In some situations, a user might define a date range or other limit (see "Enter Date Range or Limit"). The date range can be formatted as a "before date" specification, or as an "after date" specification, or as an expression pertaining to a limit, such as "<3 days old". In some cases, and as shown, a grouping of menu items can be displayed so as to facilitate user construction of a logical expression to be used in a query (see "Date Range or Limit Boolean").

A result set is presented (e.g., before, during or after construction of the query), and such a result set 604 comprises information pertaining to the individual version snapshots that are returned in response to the query. A scroll bar 606 is provided. A specific version snapshot can be selected or otherwise identified as the version snapshot to be restored (see the "Select" screen device 608).

The shown GUI 602 includes screen devices to facilitate user specification of commands (e.g., restore command) or other actions to be taken and/or to be processed using the selected version snapshot. Strictly as examples, the commands, actions and corresponding operations thereto might include aspects of mounting the version snapshot (e.g., indicating user intent to restore from the selected version snapshot) and unmounting the version snapshot when the restore has completed.

Any of the user specifications and/or selections pertaining to user entries using GUI 602 can be communicated to the filer virtual machine. If a restore request is sufficiently specified (e.g., through use of GUI 602) then the filer virtual machine will initiate a restore procedure. A series of possible restore procedure actions is shown and discussed as pertains to FIG. 7.

Figure 7:
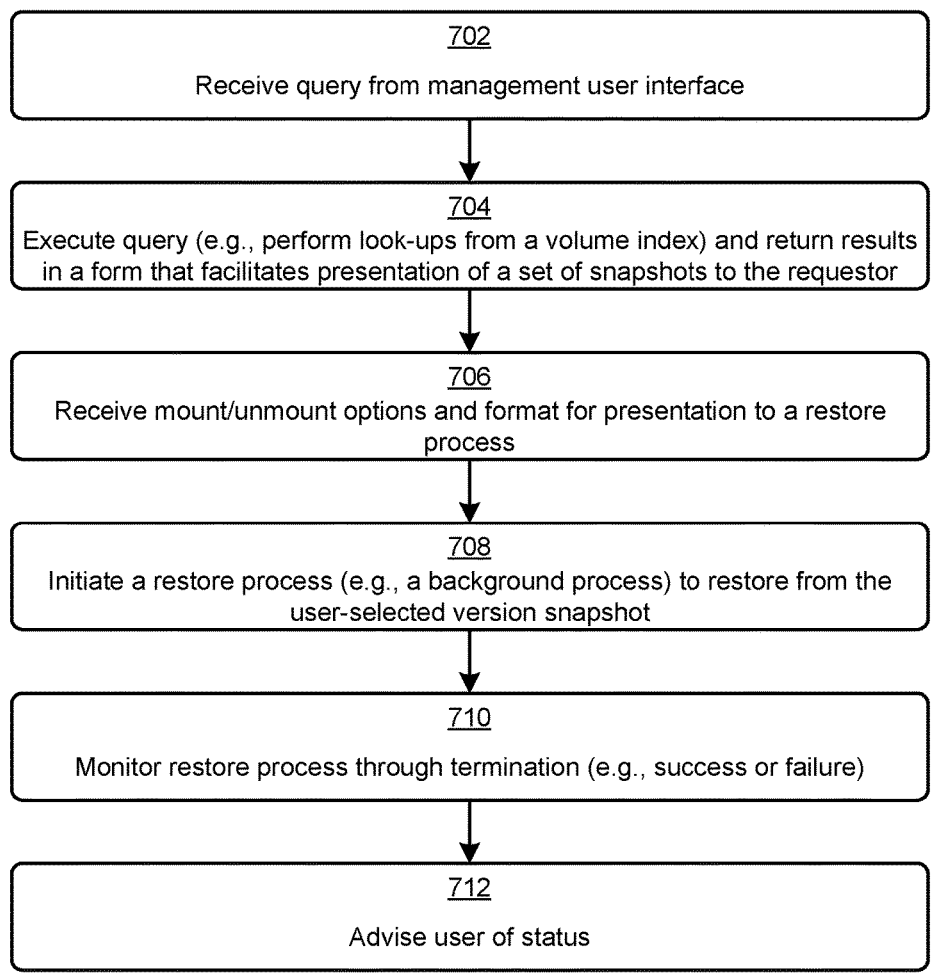
FIG. 7 depicts an example version snapshot restore procedure, according to an embodiment.

FIG. 7 depicts an example version snapshot restore procedure 700. As an option, one or more variations of version snapshot restore procedure 700 or any aspect thereof may be implemented in the context of the architecture and functionality of the embodiments described herein. Also, the version snapshot restore procedure 700 or any aspect thereof may be implemented in any environment.

The initial portions of the shown restore procedure include interaction with a user through an instance of the shown snapshot version management user interface 600. Specifically, a recipient process (e.g., a filer virtual machine) receives instructions, possibly in the form of a version specification or a query (see step 702). The recipient process returns results to the requestor. As shown, the recipient process executes the query and formats the results (e.g., see step 704). In some cases, a user might specify a particular set of mount and/or unmount options. In such cases, the recipient process formats the mount/unmount options for presentation to a restore process (see step 706), which might be initiated as a background process (see step 708). The restore process might take a short amount of real time to perform the restore, or the restore process might take a long amount of real time to perform the restore. In either case, the recipient process monitors the restore process (see step 710) through termination (e.g., through successful completion, or through a timeout or error condition, or termination for reasons other than successful completion). When the restore process terminates, the recipient process advises the user of the status (see step 712). In exemplary cases, the user is advised that the restore has been applied successfully, and that the restored portions of the file system is ready.

Additional Embodiments of the Disclosure

Additional Practical Application Examples

Figure 8A:
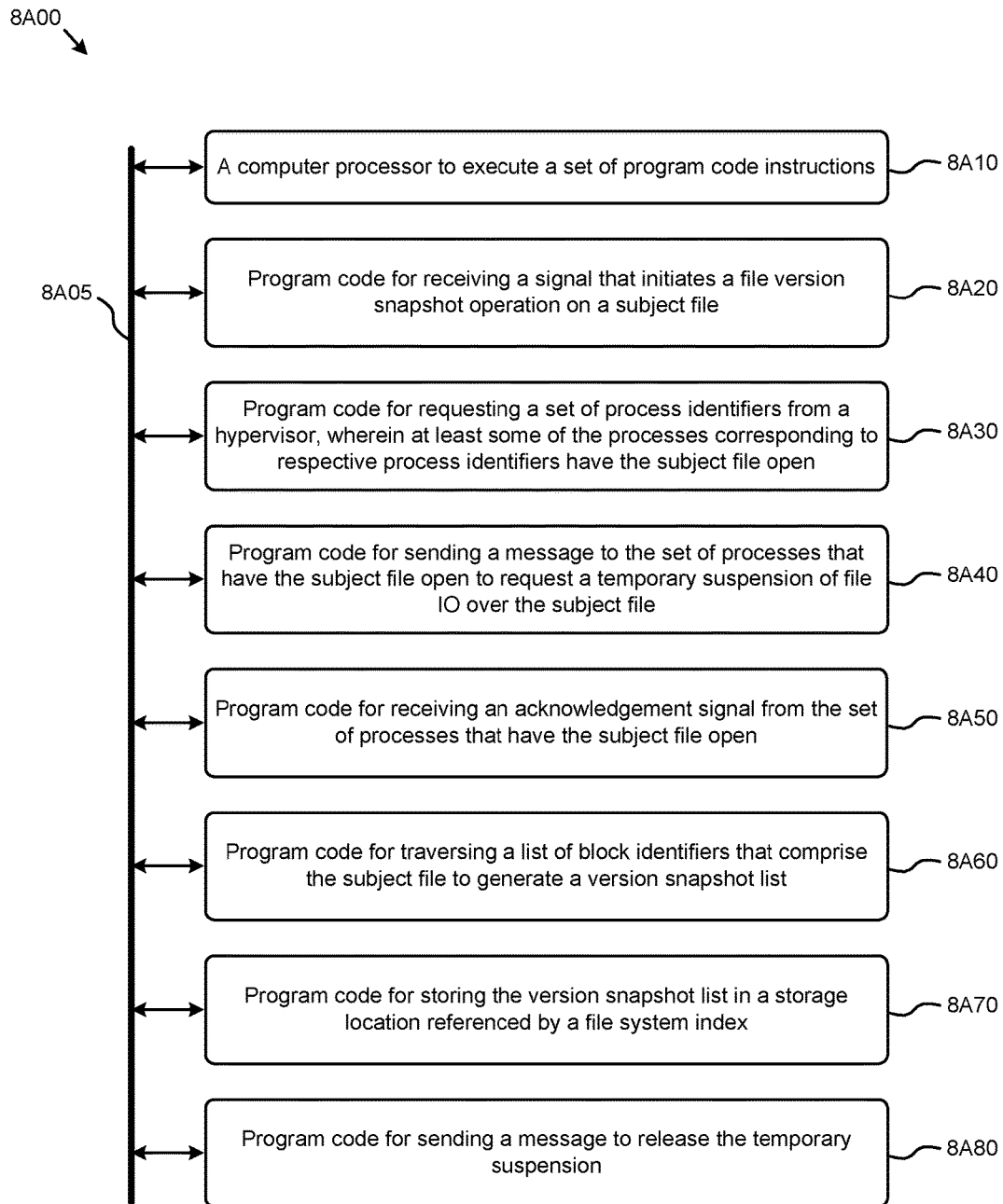
FIG. 8A, FIG. 8B, and FIG. 8C depict system components as arrangements of computing modules that are interconnected so as to implement certain of the herein-disclosed embodiments.

FIG. 8A depicts a system 8A00 as an arrangement of computing modules that are interconnected so as to operate cooperatively to implement certain of the herein-disclosed embodiments. The partitioning of system 8A00 is merely illustrative and other partitions are possible.

FIG. 8A depicts a block diagram of a system to perform certain functions of a computer system. As an option, the present system 8A00 may be implemented in the context of the architecture and functionality of the embodiments described herein. Of course, however, the system 8A00 or any operation therein may be carried out in any desired environment.

The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with other operations over communication path 8A05. The modules of the system can, individually or in combination, perform method operations within system 8A00. Any operations performed within system 8A00 may be performed in any order unless as may be specified in the claims.

The shown embodiment implements a portion of a computer system, presented as system 8A00, comprising a computer processor to execute a set of program code instructions (see module 8A10) and modules for accessing memory to hold program code instructions to perform: receiving a signal that initiates a file version snapshot operation on a subject file (see module 8A20); requesting a set of process identifiers from a hypervisor, where at least some of the processes corresponding to respective process identifiers have the subject file open (see module 8A30); sending a message to the set of processes that have the subject file open to request a temporary suspension of file IO over the subject file (see module 8A40); receiving an acknowledgement signal from the set of processes that have the subject file open (see module 8A50); traversing a list of block identifiers that comprise the subject file to generate a version snapshot list (see module 8A60); storing the version snapshot list in a storage location referenced by a file system index (see module 8A70); and sending a message to the set of processes to release the temporary suspension (see module 8A80).

In many situations the subject file can be modified over time. Strictly as examples, an add block operation can be performed on the subject file, and a new inode corresponding to the newly modified file is generated to add the new block identifier that refers to a new block added to the subject file. The previous inode can remain, and can be used to refer its corresponding version snapshot. A subject file can become smaller as a result of performing a delete block operation on the subject file, where a new inode is generated so as to remove the deleted block from the list of block identifiers that comprise the new version snapshot of the subject file. The index of a virtual disk can be persisted by serializing the system index and storing it in a nonvolatile storage location. Such a persisted serialized system index can be used in procedures that restore a particular version snapshot. Strictly as one example, a restore procedure for a particular version snapshot can commence upon reading from the nonvolatile storage location to retrieve and possibly deserialize a stored file system index that corresponds to the particular version snapshot. Aspects of the stored file system index can be presented in a graphical user interface, from which graphical user interface a user can specify characteristics of an intended restore procedure. Such a restore procedure (e.g., using a background restore process) can be initiated in response to a user-indicated restore request.

Figure 8B:
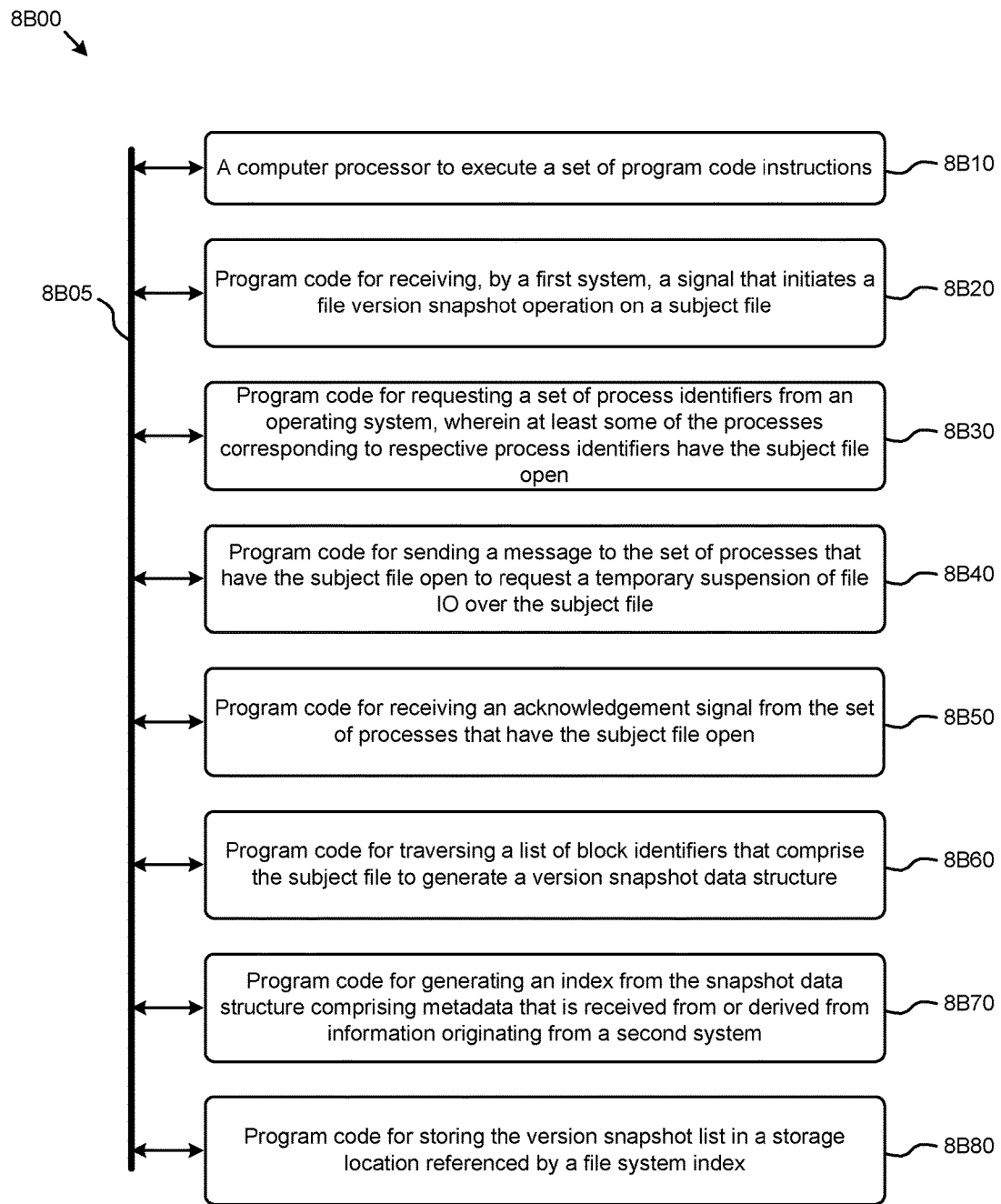

FIG. 8B depicts a system 8B00 as an arrangement of computing modules that are interconnected so as to operate cooperatively to implement certain of the herein-disclosed embodiments. The partitioning of system 8B00 is merely illustrative and other partitions are possible. As an option, the system 8B00 may be implemented in the context of the architecture and functionality of the embodiments described herein. Of course, however, the system 8B00 or any operation therein may be carried out in any desired environment.

The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with other operations over communication path 8B05. The modules of the system can, individually or in combination, perform method operations within system 8B00. Any operations performed within system 8B00 may be performed in any order unless as may be specified in the claims.

The shown embodiment implements a portion of a computer system, presented as system 8B00, comprising a computer processor to execute a set of program code instructions (see module 8B10) and modules for accessing memory to hold program code instructions to perform: receiving, by a first system, a signal that initiates a file version snapshot operation on a subject file (see module 8B20); requesting a set of process identifiers from an operating system, wherein at least some of the processes corresponding to respective process identifiers have the subject file open (see module 8B30); sending a message to the set of processes that have the subject file open to request a temporary suspension of file IO over the subject file (see module 8B40); receiving an acknowledgement signal from the set of processes that have the subject file open (see module 8B50); traversing a list of block identifiers that comprise the subject file to generate a version snapshot data structure (see module 8B60); generating an index from the snapshot data structure comprising metadata that is received from or derived from information originating from a second system (see module 8B70); and storing the version snapshot list in a storage location referenced by a file system index (see module 8B80).

Variations include:

Variations where the information originating from the second system comprises at least one of, a timestamp from the second system, an IP address of the second system, an information tag from the second system, or any combination thereof.

Variations that further comprise performing an add block operation, by the second system, on the subject file using a new block identifier that refers to a new block added to the subject file.

Variations that further comprise performing a delete block operation on the subject file by removing a deleted block from the list of block identifiers that comprise the subject file.

Variations that further comprise performing an update block operation on the subject file by changing data stored in the subject file at the updated block.

Variations that further comprise serializing at least a portion of the index and storing the serialized index in a nonvolatile storage location.

Variations that further comprise receiving a request to restore a particular version snapshot, reading from the nonvolatile storage location to retrieve a stored index that corresponds to the particular version snapshot, and deserializing a stored version snapshot corresponding to the particular version snapshot.

Variations that further comprise presenting aspects of the stored index in a graphical user interface.

Variations that further comprise receiving a restore command in response to presentation of the graphical user interface.

Variations that further comprise processing the restore command in a background process.

Variations can include more, or can include fewer or different steps than as described above.

Figure 8C:
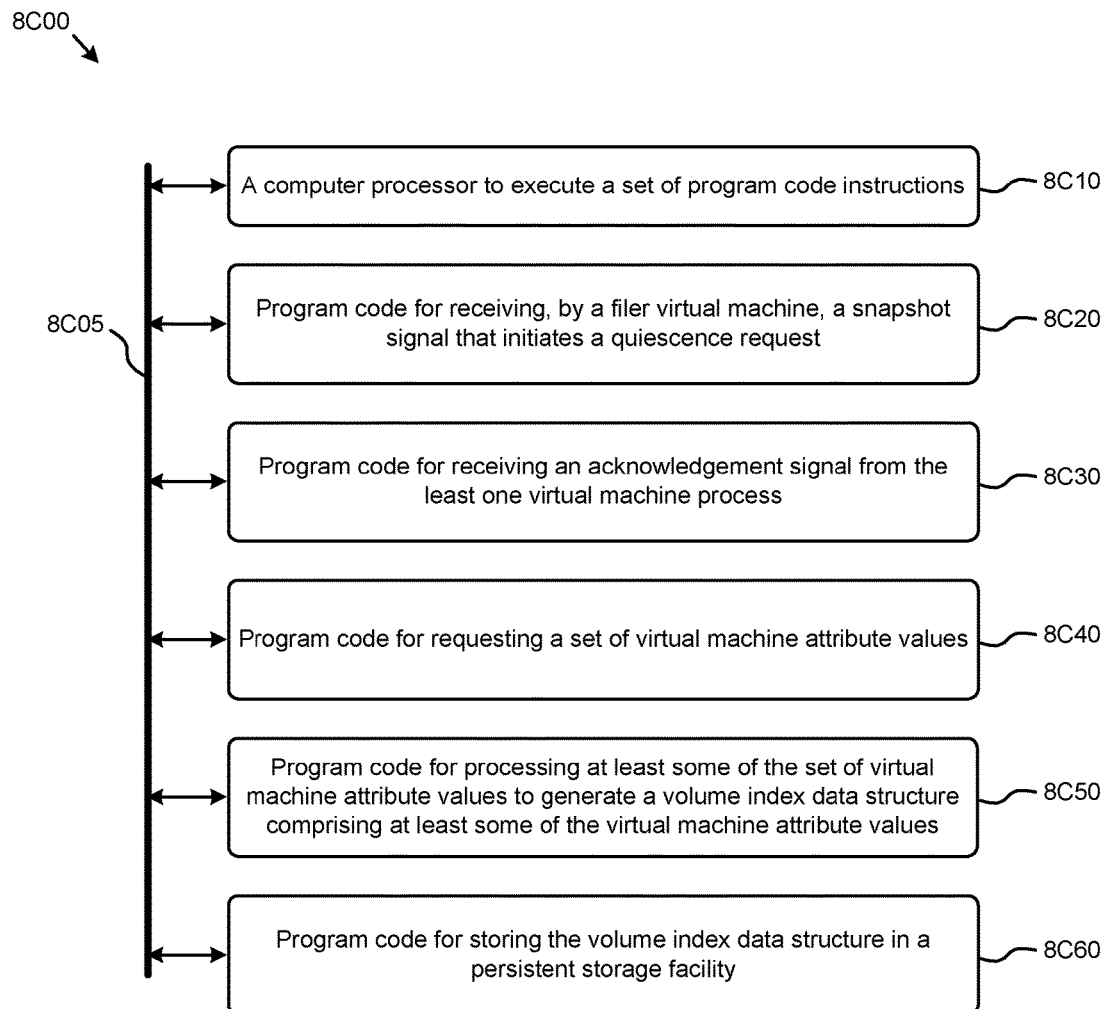

FIG. 8C depicts a system 8C00 as an arrangement of computing modules that are interconnected so as to operate cooperatively to implement certain of the herein-disclosed embodiments. As an option, the system 8C00 may be implemented in the context of the architecture and functionality of the embodiments described herein. Of course, however, the system 8C00 or any operation therein may be carried out in any desired environment.

The system 8C00 comprises at least one processor and at least one memory, the memory serving to store program instructions corresponding to the operations of the system. As shown, an operation can be implemented in whole or in part using program instructions accessible by a module. The modules are connected to a communication path 8C05, and any operation can communicate with other operations over communication path 8C05. The modules of the system can, individually or in combination, perform method operations within system 8C00. Any operations performed within system 8C00 may be performed in any order unless as may be specified in the claims.

The shown embodiment implements a portion of a computer system, presented as system 8C00, comprising a computer processor to execute a set of program code instructions (see module 8C10) and modules for accessing memory to hold program code instructions to perform: receiving, by a filer virtual machine, a snapshot signal that initiates a quiescence request (see module 8C20); receiving an acknowledgement signal from the least one virtual machine process (see module 8C30); requesting a set of virtual machine attribute values (see module 8C40); processing at least some of the set of virtual machine attribute values to generate a volume index data structure comprising at least some of the virtual machine attribute values (see module 8C50); and storing the volume index data structure in a persistent storage facility (see module 8C60).

System Architecture Overview

Additional System Architecture Examples

Figure 9A:
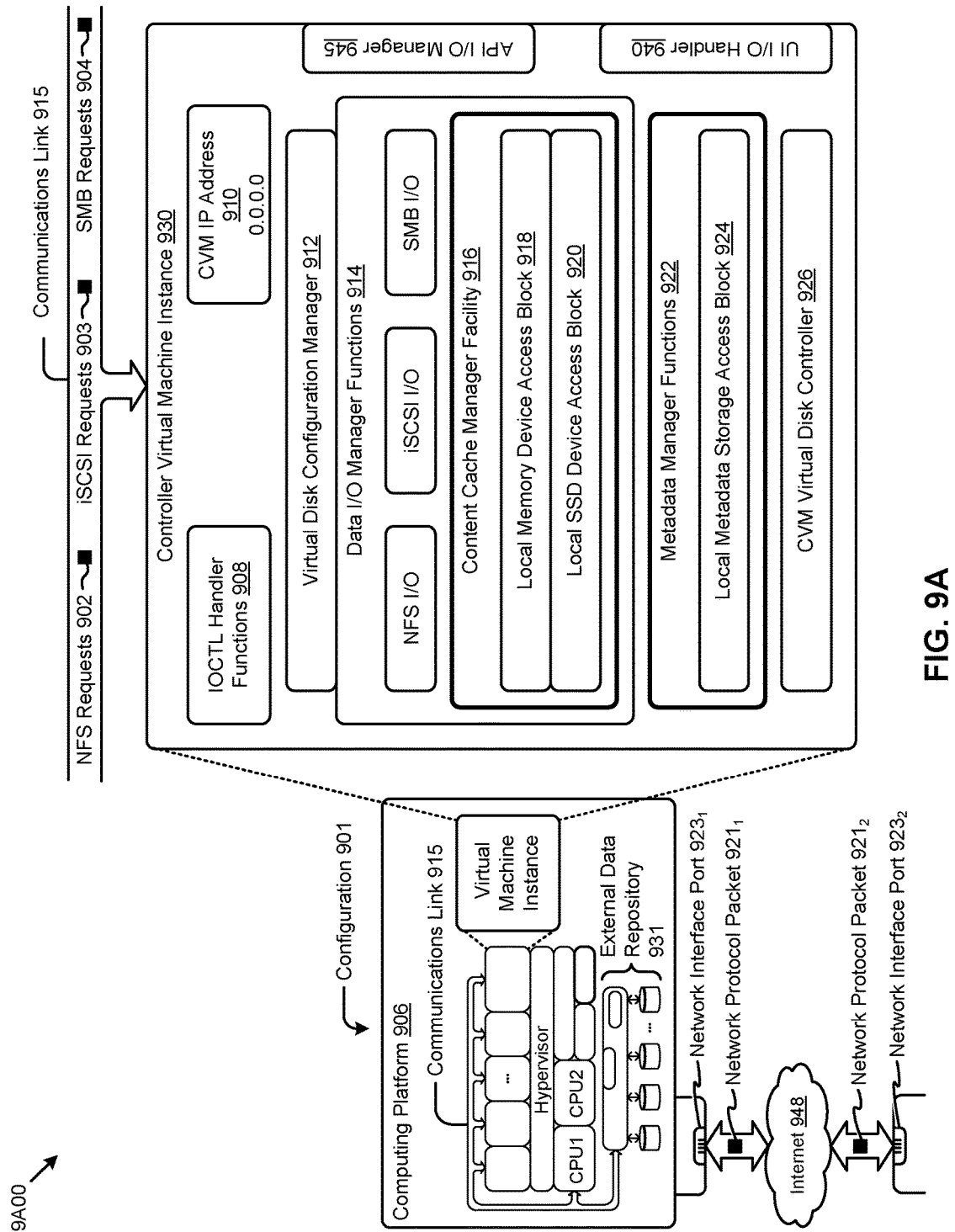
FIG. 9A and FIG. 9B depict architectures comprising a collection of interconnected components suitable for implementing embodiments of the present disclosure and/or for use in the herein-described environments.

FIG. 9A depicts an architecture 9A00 comprising a collection of interconnected components suitable for implementing embodiments of the present disclosure and/or for use in the herein-described environments. The shown virtual machine architecture 9A00 includes a virtual machine instance in a configuration 901 that is further described as pertaining to the controller virtual machine instance 930. A controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system requests (SMB) in the form of SMB requests 904. The controller virtual machine instance publishes and responds to an internet protocol (IP) address (e.g., see CVM IP address 910). Various forms of input and output (I/O or IO) can be handled by one or more IO control handler functions (see IOCTL handler functions 908) that interface to other functions such as data I/O manager functions 914 and/or metadata manager functions 922. As shown, the data IO manager functions can include communication with a virtual disk configuration manager 912 and/or can include direct or indirect communication with any of various block IO functions (e.g., NFS IO, iSCSI IO, SMB IO, etc.).

In addition to block IO functions, the configuration 901 supports IO of any form (e.g., block IO, streaming IO, packet-based IO, HTTP traffic, etc.) through either or both of a user interface (UI) handler such as UI I/O handler 940 and/or through any of a range of application programming interfaces (APIs), possibly through the shown API I/O manager 945.

The communications link 915 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes, for example, solid state storage devices (SSD) or optical or magnetic disks such as disk drives or tape drives. Volatile media includes dynamic memory such as a random access memory. As shown, the controller virtual machine instance 930 includes a content cache manager facility 916 that accesses storage locations, possibly including local DRAM (e.g., through the local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). An external data repository 931 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 924. The external data repository 931 can be configured using a CVM virtual disk controller 926, which can in turn manage any number or any configuration of virtual disks.

Execution of the sequences of instructions to practice certain embodiments of the disclosure are performed by a one or more instances of a processing element such as a data processor or such as a central processing unit (e.g., CPU1, CPU2). According to certain embodiments of the disclosure, two or more instances of configuration 901 can be coupled by a communications link 915 (e.g., backplane, LAN, PTSN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port $923_1$, network interface port $923_2$, etc.). The configuration 901 can be addressed through one or more network interface ports using an IP address. Any operational element within computing platform 906 can perform sending and receiving operations using any of a range of network protocols, possibly including network protocols that send and receive packets (e.g., see network protocol packet $921_1$ and network protocol packet $921_2$).

The computing platform 906 may transmit and receive messages that can be composed of configuration data, and/or any other forms of data and/or instructions organized into a data structure (e.g., communications packets). In some cases, the data structure includes program code instructions (e.g., application code) communicated through Internet 948 and/or through any one or more instances of communications link 915. Received program code may be processed and/or executed by a CPU as it is received, and/or program code may be stored in any volatile or non-volatile storage for later execution. Program code can be transmitted via an upload (e.g., an upload from an access device over the Internet 948 to computing platform 906). Further, program code and/or results of executing program code can be delivered to a particular user via a download (e.g., a download from the computing platform 906 over the Internet 948 to an access device).

The configuration 901 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having a plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjointed sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of the embodiments disclosed herein.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of the embodiments disclosed herein. Such files or records can be brought into and/or stored in volatile or non-volatile memory.

Figure 9B:
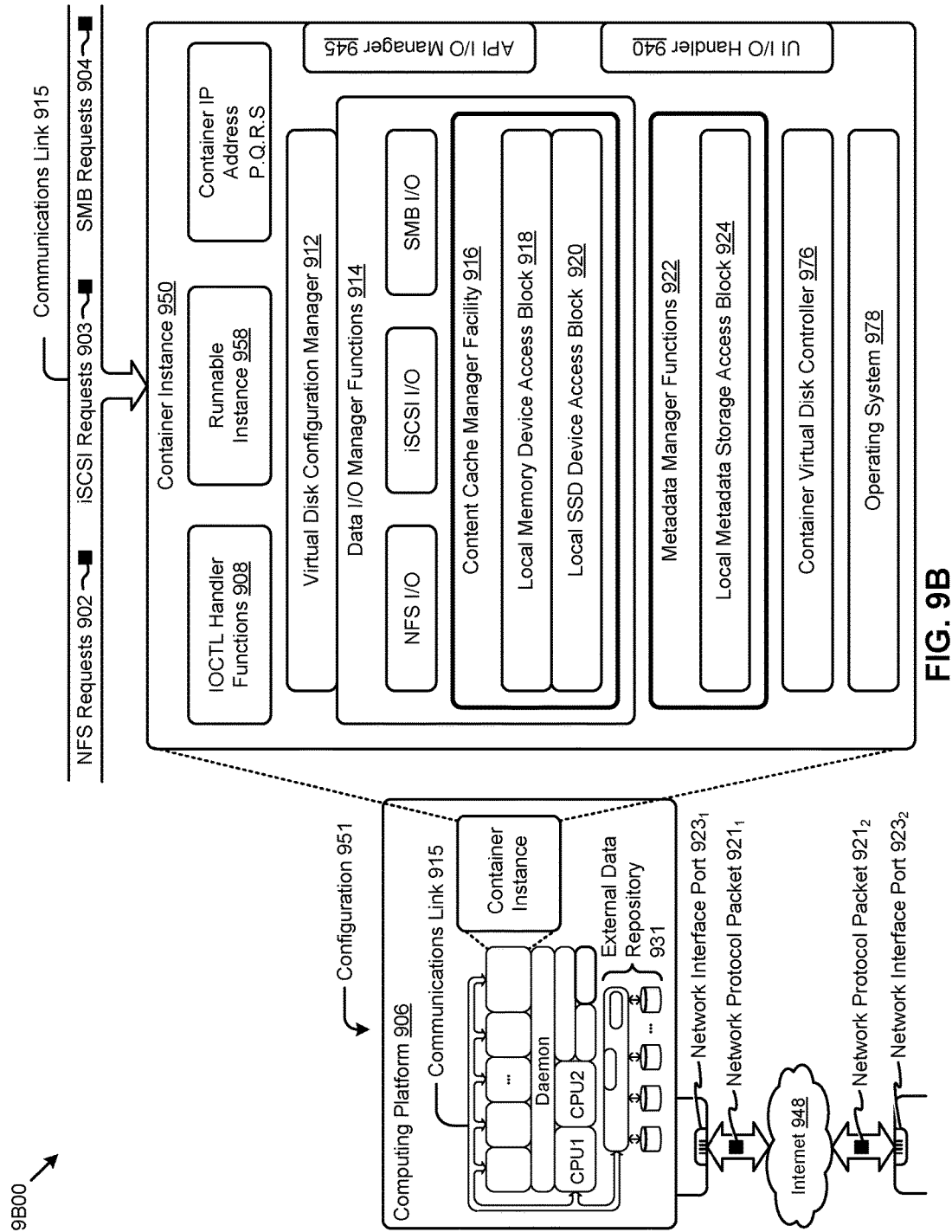

FIG. 9B depicts a containerized architecture 9B00 comprising a collection of interconnected components suitable for implementing embodiments of the present disclosure and/or for use in the herein-described environments. The shown containerized architecture 9B00 includes a container instance in a configuration 951 that is further described as pertaining to the container instance 950. The configuration 951 includes a daemon (as shown) that performs addressing functions such as providing access to external requestors via an IP address (e.g., "P.Q.R.S", as shown), a protocol specification (e.g., "http:"), and possibly port specifications. The daemon can perform port forwarding to the container. A container can be rooted in a directory system and can be accessed by file system commands (e.g., "ls" or "ls-a", etc.).

The container might optionally include an operating system 978, however such an operating system need not be provided. Instead, a container can include a runnable instance 958, which is built (e.g., through compilation and linking, or just-in-time compilation, etc.) to include all of the library- and OS-like functions needed for execution of the runnable instance. In some cases, a runnable instance 958 can be built with a virtual disk configuration manager, any of a variety of data IO management functions, etc. In some cases, a runnable instance includes code for, and access to, a container virtual disk controller 976. Such a container virtual disk controller can perform any of the functions that the aforementioned CVM virtual disk controller 926, yet such a container virtual disk controller 976 does not rely on a hypervisor or any particular operating system in order to perform its range of functions.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for implementing a virtual machine snapshot index in a virtualization environment, the method comprising:
   receiving an initiation signal that initiates sending of at least one quiescence request to at least one user virtual machine;
   quiescing the at least one user virtual machine by at least transmitting the at least one quiescence request to the at least one user virtual machine;
   confirming that the at least one user virtual machine is quiesced based on at least receipt of an acknowledgement signal from the at least one user virtual machine, the acknowledgement signal indicating that the at least one user virtual machine has quiesced;
   requesting and receiving a set of virtual machine attribute values from the at least one user virtual machine while the at least one user virtual machine is quiesced;
   generating a volume index data structure comprising at least some of the set of virtual machine attribute values received from the at least one user virtual machine while the at least one user virtual machine is quiesced; and
   storing the volume index data structure comprising the at least some of the set of virtual machine attribute values received from the at least one user virtual machine while the at least one user virtual machine is quiesced.

2. The method of claim 1, wherein the initiation signal is at least one of, a snapshot signal, a quiescence request signal.

3. The method of claim 1, wherein the set of virtual machine attribute values is requested from a hypervisor.

4. The method of claim 1, wherein virtual machine attribute values comprise at least one of, an allocated memory descriptor or a file descriptor.

5. The method of claim 4, wherein the virtual machine attribute values comprise at least one of, memory contents based on the allocated memory descriptor or file contents based on the file descriptor.

6. The method of claim 5, further comprising storing at least a portion of the memory contents or at least some of the file contents in the volume index data structure.

7. The method of claim 6, further comprising processing a query pertaining to the memory contents or the file contents.

8. The method of claim 1, further comprising forming a hash table from at least a portion of the volume index data structure.

9. The method of claim 8, further comprising processing a query pertaining to the volume index data structure by accessing the hash table.

10. The method of claim 1, wherein virtual machine attribute values comprise at least some of, paging register entries, or a list of open files, or a state variable, or any combination thereof.

11. A non-transitory computer readable medium, the non-transitory computer readable medium having stored thereon a sequence of instructions which, when stored in memory and executed by a processor causes the processor to perform a set of acts for implementing a virtual machine snapshot index in a virtualization environment, the set of acts comprising:
   receiving an initiation signal that initiates sending of at least one quiescence request to at least one user virtual machine;
   quiescing the at least one user virtual machine by at least transmitting the at least one quiescence request to the at least one user virtual machine;
   confirming that the at least one user virtual machine is quiesced based on at least receipt of an acknowledgement signal from the at least one user virtual machine, the acknowledgement signal indicating that the at least one user virtual machine has quiesced;
   requesting and receiving a set of virtual machine attribute values from the at least one user virtual machine while the at least one user virtual machine is quiesced;
   generating a volume index data structure comprising at least some of the set of virtual machine attribute values received from the at least one user virtual machine while the at least one user virtual machine is quiesced; and
   storing the volume index data structure comprising the at least some of the set of virtual machine attribute values received from the at least one user virtual machine while the at least one user virtual machine is quiesced.

12. The computer readable medium of claim 11, wherein the initiation signal is at least one of, a snapshot signal, a quiescence request signal.

13. The computer readable medium of claim 11, wherein the set of virtual machine attribute values is requested from a hypervisor.

14. The computer readable medium of claim 11, wherein virtual machine attribute values comprise at least one of, an allocated memory descriptor or a file descriptor.

15. The computer readable medium of claim 14, wherein the virtual machine attribute values comprise at least one of, memory contents based on the allocated memory descriptor or file contents based on the file descriptor.

16. The computer readable medium of claim 15, wherein the set of acts further comprise storing at least a portion of the memory contents or at least some of the file contents in the volume index data structure.

17. The computer readable medium of claim 16, wherein the set of acts further comprise processing a query pertaining to the memory contents or the file contents.

18. The computer readable medium of claim 11, wherein the set of acts further comprise of forming a hash table from at least a portion of the volume index data structure.

19. A system for implementing a virtual machine snapshot index in a virtualization environment, the system comprising:
- a storage medium having stored thereon a sequence of instructions; and
- a processor or processors that execute the sequence of instructions to cause the processor or processors to perform a set of acts, the set of acts comprising:
    - receiving an initiation signal that initiates sending of at least one quiescence request to at least one user virtual machine;
    - quiescing the at least one user virtual machine by at least transmitting the at least one quiescence request to the at least one user virtual machine;
    - confirming that the at least one user virtual machine is quiesced based on at least receipt of an acknowledgement signal from the at least one user virtual machine, the acknowledgement signal indicating that the at least one user virtual machine has quiesced;
    - requesting and receiving a set of virtual machine attribute values from the at least one user virtual machine while the at least one user virtual machine is quiesced;
    - generating a volume index data structure comprising at least some of the set of virtual machine attribute values received from the at least one user virtual machine while the at least one user virtual machine is quiesced; and
    - storing the volume index data structure comprising the at least some of the set of virtual machine attribute values received from the at least one user virtual machine while the at least one user virtual machine is quiesced.

20. The system of claim 19, wherein the initiation signal is at least one of, a snapshot signal, a quiescence request signal.

* * * * *